(12) United States Patent  
Inoue et al.

(10) Patent No.: US 8,823,668 B2  
(45) Date of Patent: Sep. 2, 2014

(54) LIQUID CRYSTAL DEVICE

(75) Inventors: Akira Inoue, Osaka (JP); Isao Kajima, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 172 days.

(21) Appl. No.: 13/513,518

(22) PCT Filed: Nov. 10, 2010

(86) PCT No.: PCT/JP2010/069978  
§ 371 (c)(1),  
(2), (4) Date: Jun. 1, 2012

(87) PCT Pub. No.: WO2011/070884  
PCT Pub. Date: Jun. 16, 2011

(65) Prior Publication Data  
US 2012/0235948 A1    Sep. 20, 2012

(30) Foreign Application Priority Data  
Dec. 8, 2009   (JP) .................................. 2009-278590

(51) Int. Cl.  
*G09G 3/36* (2006.01)  
*G06F 3/041* (2006.01)  
*G02F 1/1333* (2006.01)

(52) U.S. Cl.  
CPC .......... *G02F 1/1333* (2013.01); *G02F 1/13338* (2013.01)  
USPC ................. 345/173; 345/87; 345/92; 345/174

(58) Field of Classification Search  
CPC .... G02F 1/1333; G02F 1/1345; G02F 1/1368  
USPC ....................... 345/87, 92, 173, 174  
See application file for complete search history.

(56) References Cited

U.S. PATENT DOCUMENTS

| | | |
|---|---|---|
| 2006/0193117 A1 | 8/2006 | Miyata |
| 2008/0062148 A1* | 3/2008 | Hotelling et al. ............. 345/174 |
| 2008/0180585 A1 | 7/2008 | Kubota et al. |
| 2009/0115743 A1 | 5/2009 | Oowaki |
| 2009/0185100 A1 | 7/2009 | Matsuhira et al. |

FOREIGN PATENT DOCUMENTS

| | | |
|---|---|---|
| JP | 2004-325967 A | 11/2004 |
| JP | 2007-86162 A | 4/2007 |
| JP | 2008-181438 A | 8/2008 |
| JP | 2008-262160 A | 10/2008 |
| JP | 2009-116090 A | 5/2009 |
| JP | 2009-122655 A | 6/2009 |

* cited by examiner

*Primary Examiner* — Amare Mengistu  
*Assistant Examiner* — Jennifer Zubajlo  
(74) *Attorney, Agent, or Firm* — Chen Yoshimura LLP

(57) ABSTRACT

Disclosed is a liquid crystal device having improved assembly workability. A liquid crystal device of the present invention is provided with: a liquid crystal panel 31; a liquid crystal panel driver 21 that drives the liquid crystal panel 31; a touch panel 50 disposed on the display surface side of the liquid crystal panel 31; a touch panel driver 22 that drives the touch panel 50; and a flexible substrate 40, which is electrically connected to a control circuit board 12 that controls a drive of the liquid crystal panel 31 and a drive of the touch panel 50. The liquid crystal panel driver 21 and the touch panel driver 22 are electrically connected to the control circuit substrate 12, respectively, through the same flexible substrate 40.

2 Claims, 18 Drawing Sheets

LIQUID CRYSTAL DEVICE

TECHNICAL FIELD

The present invention relates to a liquid crystal device.

BACKGROUND ART

Liquid crystal devices equipped with a liquid crystal panel are used for portable terminal devices such as mobile phones and PDAs and electronic devices such as computers and televisions. In such liquid crystal devices, a liquid crystal panel and an external driver circuit that controls the liquid crystal panel are electrically connected through a flexible substrate, for example. By using a flexible substrate that has flexibility, the liquid crystal panel and the external driver circuit can be connected to the flexible substrate with ease. The liquid crystal device described in Patent Document 1 below is known as an example of a liquid crystal device using such a flexible substrate.

RELATED ART DOCUMENTS

Patent Documents

Patent Document 1: Japanese Patent Application Laid-Open Publication No. 2007-86162

Problems to be Solved by the Invention

The liquid crystal device in Patent Document 1 above is equipped with two liquid crystal panels, and from the respective liquid crystal panels, different flexible substrates are respectively led out. These led out flexible substrates are electrically connected to each other by connecting an end portion of one flexible substrate to the other flexible substrate. The other flexible substrate is connected to an external driver circuit that drives both of the liquid crystal panels. When a liquid crystal device has a plurality of driving targets (two liquid crystal panels here) as described, if a flexible substrate is configured to be led out from each of the driving targets, the number of flexible substrates is increased to the number of the driving targets, and the respective flexible substrates need to be connected to each other, which lowers assembly workability. Although the configuration disclosed in Patent Document 1 above has two liquid crystal panels as the driving targets, the same problem (increase in the number of flexible substrates) also occurs in a configuration having, as a plurality of driving targets, a liquid crystal panel and an additional function component (a touch panel or the like, for example) that provides an additional function to the display of this liquid crystal panel, for example.

SUMMARY OF THE INVENTION

The present invention is made in view of the above-mentioned problem, and an object of the present invention is to provide a liquid crystal device with improved assembly workability.

Means for Solving the Problems

In order to solve the above-mentioned problem, a liquid crystal device according to the present invention includes: a liquid crystal panel; a liquid crystal panel driver that drives the liquid crystal panel; an additional function component disposed so as to cover a surface of the liquid crystal panel, the additional function component providing an additional function to a display of the liquid crystal panel; an additional function component driver that drives the additional function component; and a flexible substrate that is electrically connected to an external driver circuit that respectively controls a drive of the liquid crystal panel and a drive of the additional function component, wherein the liquid crystal panel driver and the additional function component driver are electrically connected to the external driver circuit, respectively, through the same flexible substrate.

In the present invention, both of the liquid crystal panel driver and the additional function component driver are electrically connected to the external driver circuit through the same flexible substrate. This makes it possible to reduce the number of parts, and therefore makes it easier to electrically connect the two drivers to the external driver circuit as compared with the configuration in which the liquid crystal panel driver and the additional function component driver are respectively connected to different flexible substrates. The present invention also includes a configuration where the liquid crystal panel driver and the additional function component driver are unified as a single component, and with this configuration, the number of parts can be reduced, thereby shortening the part mounting time.

In the above-mentioned configuration, the flexible substrate may be electrically connected to the additional function component and to the liquid crystal panel, respectively, through anisotropic conductive films. With this configuration, it becomes easier to electrically connect the flexible substrate to the additional function component and to the liquid crystal panel, respectively, as compared with a configuration where the electrical connection is established by soldering the respective members, for example.

The liquid crystal panel may be provided with an element substrate that has switching elements for driving liquid crystals in respective pixels. The liquid crystal panel driver may be disposed on a surface of the element substrate on a side facing the additional function component. The flexible substrate may have a main section that is formed in a rectangular shape in a plan view and an extended section that is extended from a periphery of the main section in a substantial L shape. Of the main section and the extended section, one may be attached to the additional function component, and the other may be attached to the element substrate. The additional function component driver may be disposed in the element substrate on a side facing the additional function component, and may be electrically connected to the additional function component through the flexible substrate.

Because the liquid crystal panel driver and the additional function component driver are disposed on the same surface (the surface of the element substrate on the side facing the additional function component), it becomes easier to perform the mounting operation of the two drivers at the same time. This improves the mounting workability as compared with a configuration where the two drivers are respectively disposed on two surfaces opposite to each other, for example.

The additional function component may be arranged on a display surface side of the liquid crystal panel, and the liquid crystal panel may be provided with an element substrate that has switching elements for driving liquid crystals in respective pixels. The liquid crystal panel driver may be disposed in the element substrate on the side facing the additional function component. The flexible substrate may be formed in a rectangular shape in a plan view, an end portion of the flexible substrate in one side direction may be attached to the additional function component, and a center portion of the flexible substrate in the one side direction may be attached to the element substrate. The liquid crystal panel driver may be disposed so as to be covered by a section between the end portion and the center portion of the flexible substrate in the one side direction from the display surface side of the liquid crystal panel.

By covering the liquid crystal panel driver by the section of the flexible substrate, the liquid crystal panel driver can be protected. The "center portion" of the flexible substrate in the one side direction may be a section closer to the center of the flexible substrate than the "end portion" thereof in the same direction.

The additional function component may be disposed on the display surface side of the liquid crystal panel. The liquid crystal panel may be provided with an element substrate that has switching elements for driving liquid crystals in respective pixels and a color filter substrate that is disposed between the element substrate and the additional function component. On a surface of the color filter substrate on the side facing the element substrate, a connecting section that is electrically connected to the element substrate may be formed. The liquid crystal panel driver may be connected to the connecting section through an anisotropic conductive film.

In connecting the anisotropic conductive film to a component, the anisotropic conductive film may be heated. By disposing the connecting section that is connected to the anisotropic conductive film on the side of color filter substrate, it becomes possible to prevent heat generated in connecting the film from being transmitted to the element substrate.

The flexible substrate may have a main section that is formed in a rectangular shape in a plan view and an extended section that is extended from a periphery of the main section. Of the main section and the extended section, one may be attached to the additional function component, and the other may be attached to the connecting section.

The flexible substrate may be formed in a rectangular shape in a plan view, and the flexible substrate may have a flap that is made by cutting out a portion of the flexible substrate. The flexible substrate may be configured such that the flap can be bent separately from the remaining portion of the main section, and such that, of the main section and the flap, one is attached to the additional function component and the other is attached to the connecting section.

In the present invention, a flap that can be bent separately from the main section is formed by cutting the flexible substrate, thereby making it possible to connect the flexible substrate to both of the additional function component and the connecting section. The flexible substrate itself is formed in a rectangular shape in a plan view, allowing for easy handling in an assembly process and the like (such as transportation or storing them in an organized manner), for example.

The flap may be made by cutting an inner portion of the flexible substrate in a plan view.

Alternatively, the flap may be made by cutting an edge portion of the flexible substrate.

The flexible substrate may be formed in an S shape in a cross-sectional view having two folded sections. Of an edge portion and a section between the two folded sections in the flexible substrate, one may be attached to the additional function component, and the other may be attached to the connecting section.

In the present invention, by forming the single flexible substrate so as to have two folded sections, the flexible substrate can be connected to both the additional function component and the connecting section. This configuration can eliminate the need to form a flap or the like in the flexible substrate, for example, and is therefore preferable.

As an example of the element substrate, a TFT substrate having thin film transistors can be used.

As an example of the additional function component, a touch panel that is provided on the display surface side of the liquid crystal panel can be used. As an example of the additional function component driver, a touch panel driver that drives the touch panel can be used.

Effects of the Invention

According to the present invention, a liquid crystal device with improved assembly workability can be provided.

DETAILED DESCRIPTION OF EMBODIMENTS

Embodiment 1

Figure 1:
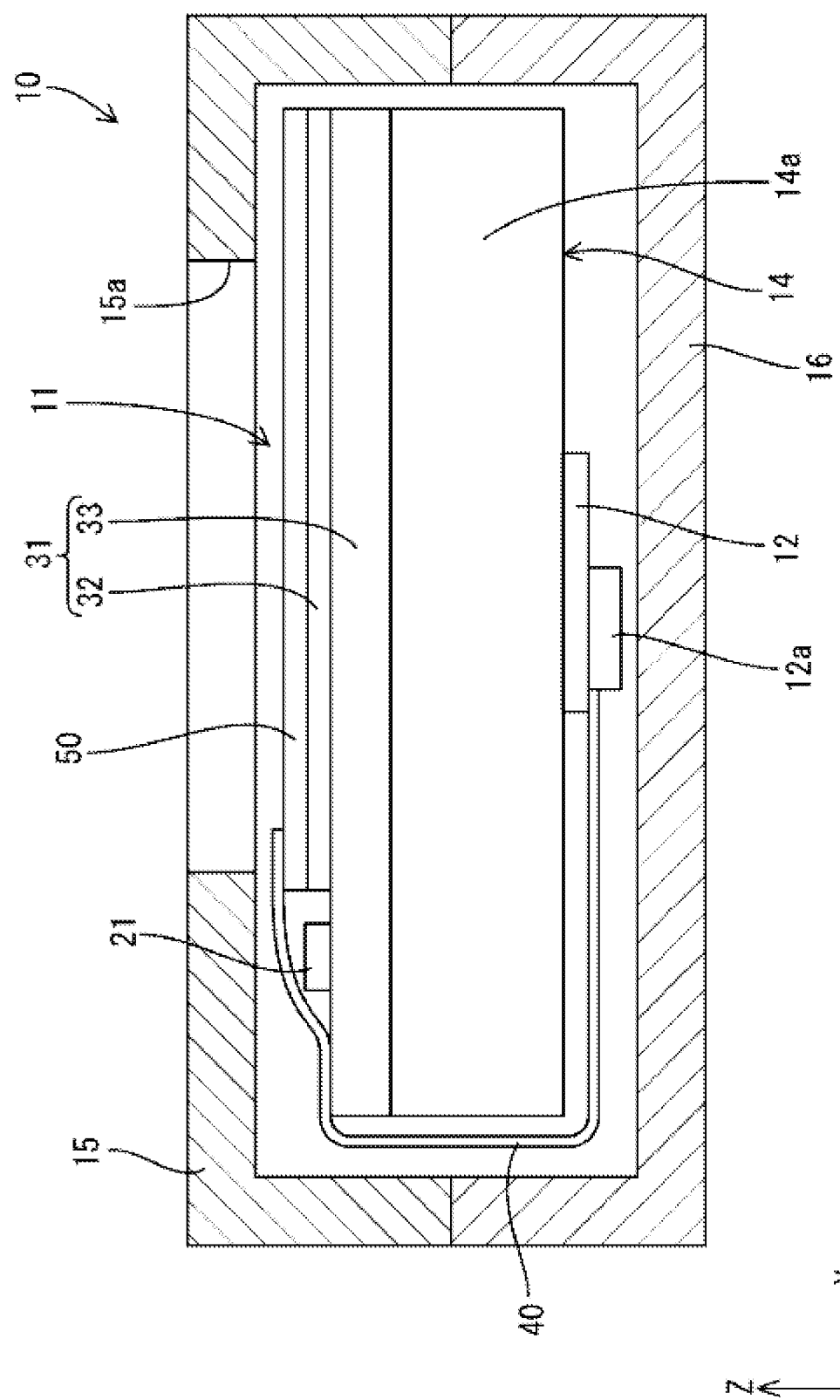
FIG. 1 is a cross-section view showing a cross-sectional configuration along a shorter side direction of a liquid crystal display device according to Embodiment 1 of the present invention.
Figure 2:
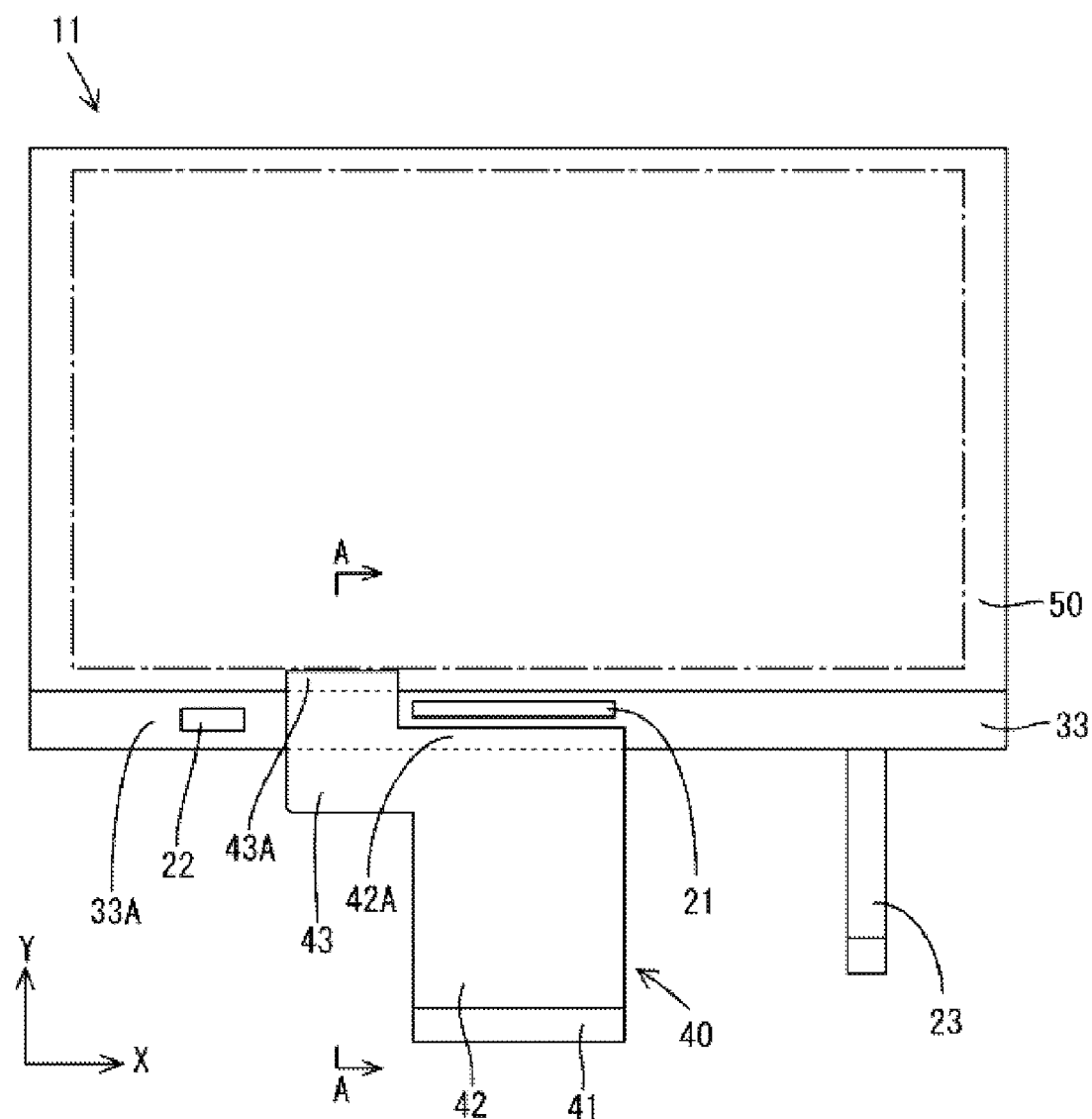
FIG. 2 is a plan view showing a liquid crystal device according to Embodiment 1 of the present invention.
Figure 3:
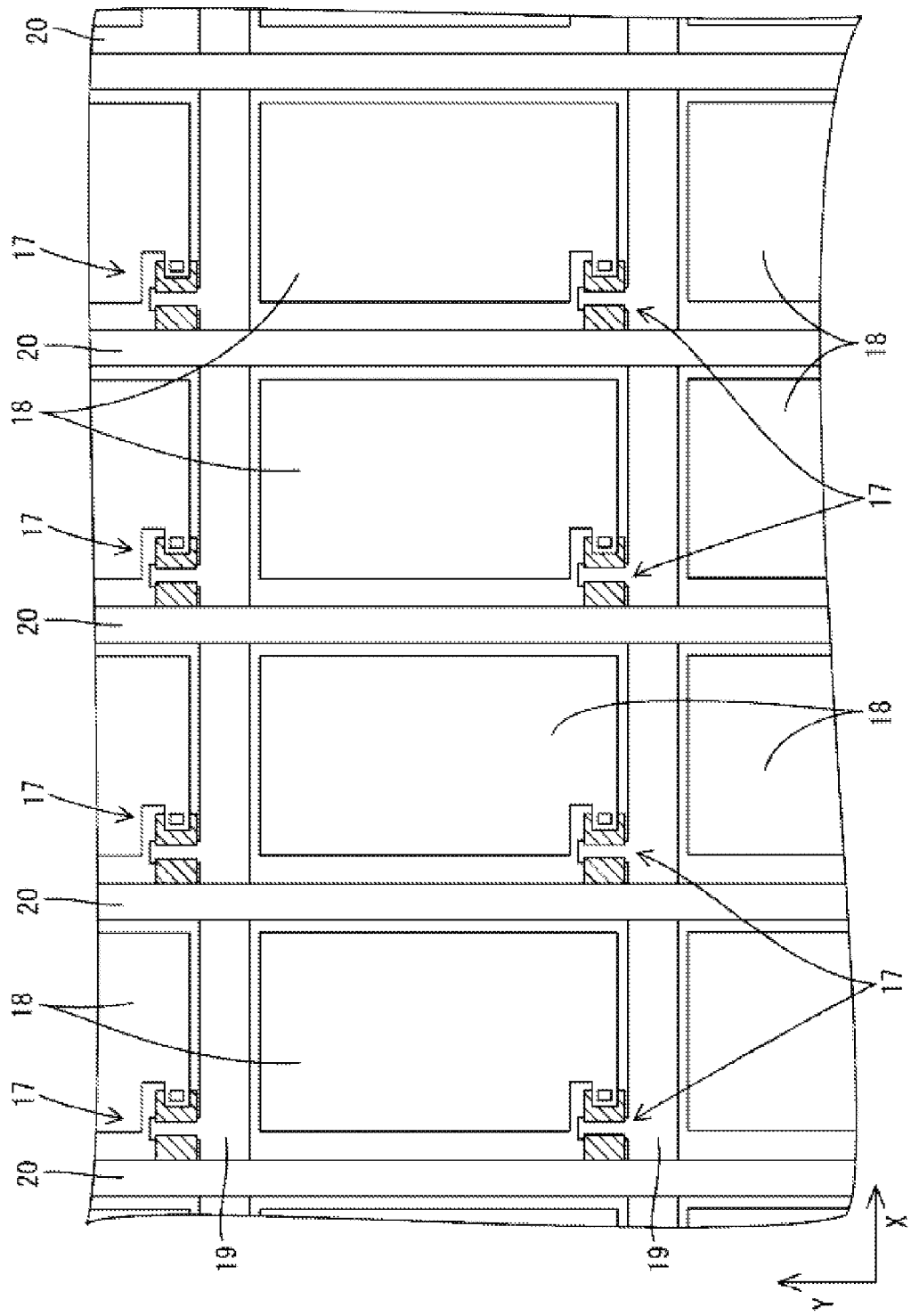
FIG. 3 is an enlarged plan view showing a configuration of wiring lines on a TFT substrate of a liquid crystal panel.
Figure 4:
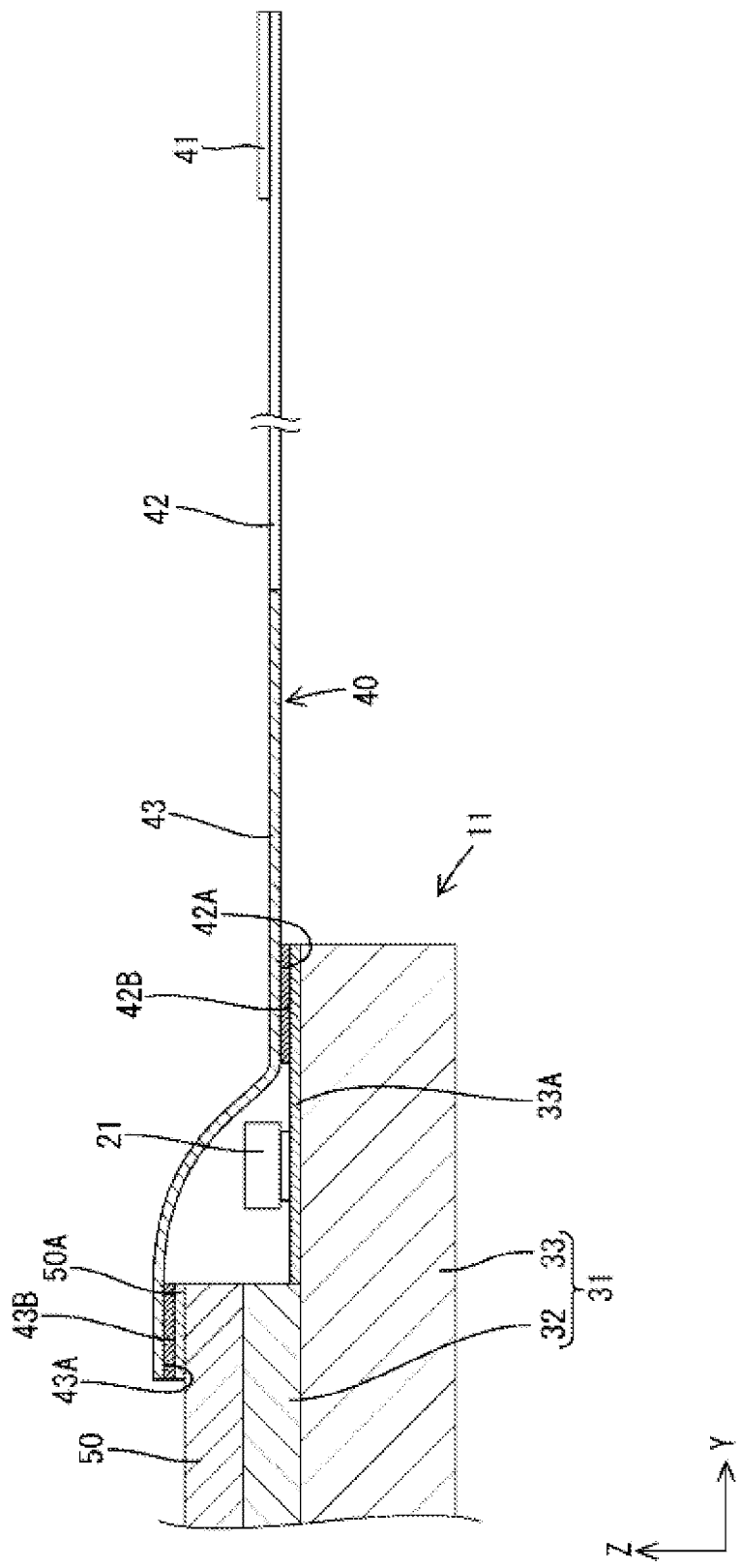
FIG. 4 is a cross-sectional view (cross-sectional view along the line A-A in FIG. 2) showing a cross-sectional configuration of a liquid crystal device along the shorter side direction.

Embodiment 1 of the present invention will be explained with reference to FIGS. 1 to 5. In this embodiment, a liquid crystal device 11 provided in a liquid crystal display device 10 is explained as an example. First, the liquid crystal display device 10 will be explained. The liquid crystal display device 10 can be used for various electronic devices (not shown) such as portable digital assistants, mobile phones, laptop computers, and potable gaming devices. In some of the figures, X axis, Y axis, and Z axis are shown. The longer side direction of the liquid crystal display device 10 and a liquid crystal panel 31 (described below) is represented as X axis, and the shorter side direction is represented as Y axis. The vertical direction in the figures such as FIG. 1 and FIG. 4 is represented as Z axis (front and back direction). The upper side in the figure is a front side, and the lower side in the figure is a rear side.

As shown in FIG. 1, the liquid crystal display device 10 includes the liquid crystal device 11 that is mainly constituted of the liquid crystal panel 31 and a touch panel 50 (additional function component), a control circuit board 12 that respectively controls a drive of the liquid crystal panel 31 and a drive of the touch panel 50, and a backlight device 14, which is an external light source for supplying light to the liquid crystal panel 31. The liquid crystal display device 10 also includes housing members 15 and 16, which is a pair of a front side member and a rear side member, for containing and holding the liquid crystal panel 31 and the backlight device 14. In the front side housing member 15, an opening 15a is formed so as to expose a display surface of the liquid crystal panel 31 and a front side surface of the touch panel 50 to the outside.

First, the backlight device 14 will be briefly explained. The backlight device 14 includes a chassis 14a that is substantially box-shaped and that has an opening toward the front side (side of the liquid crystal panel 31), a not-shown light source (such as cold-cathode fluorescent lamps or LEDs, for example) that is disposed inside of the chassis 14a, and an optical member that is disposed so as to cover the opening of the chassis 14a. This optical member has functions such as converting light emitted from the light source into planar light. A light source flexible substrate 23 (shown in FIG. 2) is led out from the backlight device 14, and the light source in the chassis 14a is electrically connected to an external driver circuit (not shown) through this light source flexible substrate 23.

As shown in FIG. 1, the control circuit board 12 is attached to the rear surface (outer surface on the side opposite to the liquid crystal panel 31) of the chassis 14a of the backlight device 14 by screws or the like. In the control circuit board 12, electronic components (control circuit) for controlling a transmission of driving signals to the liquid crystal panel 31 and the touch panel 50 are mounted on a substrate that is made of a phenolic paper or a glass epoxy resin. The mounting position of the control circuit board 12 is not limited to this, and may be changed appropriately. In the control circuit board 12, conductive paths (not shown) are arranged in a prescribed pattern, and a connector 12a that is connected to the conductive paths is mounted thereon. A terminal section 41 of a flexible substrate 40 (described below) is attached to the connector 12a, thereby establishing an electrical connection between the control circuit board 12 and the flexible substrate 40. The electrical connection between the control circuit board 12 and the flexible substrate 40 is not limited to this connecting structure.

Next, a configuration of the liquid crystal device 11 will be described in detail. As shown in FIGS. 1 and 2, the liquid crystal device 11 includes the liquid crystal panel 31 that is a display panel for displaying images, the touch panel 50 that is disposed on the liquid crystal panel 31 on the side of the display surface (front side), and the flexible substrate 40 that connects the control circuit substrate 12 to the liquid crystal panel 31 and to the touch panel 50, respectively.

The liquid crystal panel 31 is formed in a rectangular shape (quadrangular shape) that is longer in the horizontal direction as a whole, and includes a pair of substrates 32 and 33 that are made of transparent glass (having a light-transmitting property), and a liquid crystal layer (not shown) interposed between the two substrates 32 and 33. The liquid crystal layer includes liquid crystal molecules, which change its optical property in accordance with electrical field application. The two substrates 32 and 33 are bonded by a not-shown sealing agent, while maintaining a gap therebetween that corresponds to a thickness of the liquid crystal layer. The longer side direction in the liquid crystal panel 31 corresponds to the X axis direction, and the shorter side direction corresponds to the Y axis direction.

Of the two substrates 32 and 33, one on the front side (upper side in FIG. 1) is a CF substrate 32, and the other on the rear side (rear surface side) is a TFT substrate 33 (element substrate). In other words, the CF substrate 32 is disposed between the TFT substrate 33 and the touch panel 50. As shown in FIG. 3, on the inner surface side of the TFT substrate 33 (side of the liquid crystal layer, and the side facing the CF substrate 32), a plurality of TFTs 17 (Thin Film Transistors) and a plurality of pixel electrodes 18 are arranged. The TFTs 17 are switching elements for driving the liquid crystals in the respective pixels. Gate wiring lines 19 and source wiring lines 20 are arranged in a grid pattern so as to enclose these TFTs 17 and the pixel electrodes 18, respectively. The gate wiring lines 19 and the source wiring lines 20 are connected to the gate electrodes and the source electrodes of the TFTs 17, respectively, and the pixel electrodes 18 are connected to the drain electrodes of the TFTs 17, respectively. These pixel electrodes 18 are made of a transparent electrode such as ITO (Indium Tin Oxide) or ZnO (Zinc Oxide).

Figure 5:
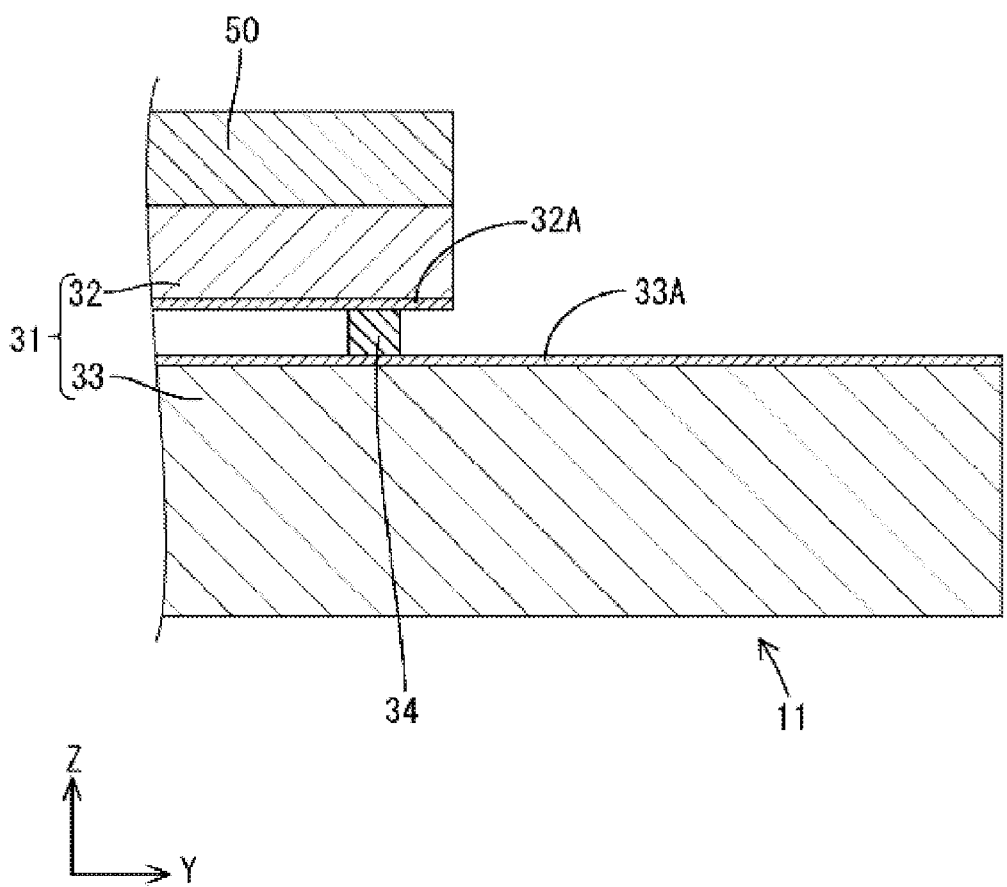
FIG. 5 is an enlarged cross-sectional view showing a section where a TFT substrate and a CF substrate face each other.

On the other hand, the CF substrate 32 includes a color filter. In the color filter, respective colored sections of R (red), G (green), B (blue), and the like are arranged so as to correspond to the respective pixels. Between the respective colored sections that constitute the color filter, a light-shielding layer (black matrix) is formed so as to prevent the colors from being mixed. On the surfaces of the color filter and the light-shielding layer, an opposite electrode 32A is formed so as to face the pixel electrodes 18 in the TFT substrate 33. As shown in FIG. 5, the opposite electrode 32A is electrically connected to the TFT substrate 33 through a conductive member 34 (such as a conductive carbon paste), for example. On the inner surfaces of the two substrates 32 and 33, alignment films are respectively formed for controlling an orientation of the liquid crystal molecules included in the liquid crystal layer. On the outer surfaces of the two substrates 32 and 33, not-shown polarizing plates are respectively provided.

The touch panel 50 is an input device, and is made of a transparent panel that detects coordinates. The touch panel 50 is disposed so as to cover the display surface of the liquid crystal panel 31 (front side of the CF substrate 32, and the front surface of the liquid crystal panel), and allows a user to perform an data input (coordinate data on the touch panel 50, for example) and the like by pointing the surface with a touch pen, a finger, or the like. That is, the touch panel 50 is an additional function component that provides an additional function to the display of the liquid crystal panel 31. The touch panel 50 is attached to the polarizing plate on the front side of the liquid crystal panel 31 by an ultraviolet curable resin (UV curable resin), for example. By using the UV curable resin in attaching them, light reflection at the interface between the liquid crystal panel 31 and the touch panel 50 can be prevented.

As shown in FIGS. 1 and 2, the touch panel 50 and the CF substrate 32 have substantially the same shape and size. The TFT substrate 33 is formed to be slightly larger than the CF substrate 32 (or the touch panel 50). Specifically, the length of the TFT substrate 33 in the shorter side direction (Y axis direction) is longer than the length of the CF substrate 32 in the shorter side direction (Y axis direction). Therefore, when the two substrates 32 and 33 are bonded to each other, the TFT substrate 33 is extended beyond the CF substrate 32 to one side (lower side in FIG. 2). In this extended section (one end of the TFT substrate 33 in the shorter side direction), a TFT substrate terminal section 33A where the gate wiring lines 19 and the source wiring lines 20 are led out is formed.

As shown in FIGS. 2 and 4, in this TFT substrate terminal section 33A, a liquid crystal panel driver 21 for driving the liquid crystal panel 31 and a touch panel driver 22 (additional function component driver) for driving the touch panel 50 are mounted by the COG (Chip On Glass) technique, respectively. In other words, the TFT substrate terminal section 33A is formed on a surface of the TFT substrate 33 on the side facing the touch panel 50, and on the same surface, the liquid crystal panel driver 21 and the touch panel driver 22 are disposed. The TFT substrate terminal section 33A is connected to the liquid crystal panel driver 21 and to the touch panel driver 22 through anisotropic conductive films (ACF connection), for example, and therefore, the TFT substrate terminal section 33A is electrically connected to the liquid crystal panel driver 21 and to the touch panel driver 22, respectively. The touch panel driver 22 also has a function of transmitting a signal that is input through the touch panel 50 to the above-mentioned control circuit board 12.

Next, the flexible substrate 40 will be explained in detail. As shown in FIG. 1, the flexible substrate 40 is provided for electrically connecting the control circuit board 12 that is disposed on the backlight device 14 to the touch panel 50 and to the liquid crystal panel 31, respectively. In the flexible substrate 40, a plurality of wiring patterns (not shown) are formed on a film-shaped substrate that is made of a material (polyimide resin or the like, for example) that has an insulating property and flexibility.

The flexible board 40 includes a main section 42 that is formed in a rectangular shape in a plan view and an extended section 43 that is extended from the periphery of the main section 42 in a substantial L shape in a plan view. More specifically, the main section 42 is formed to be longer in the Y axis direction, and the extended section 43 is extended from an end portion of one longer side, which is closer to the touch panel, in the periphery of the main section 42. The extended section 43 is attached to the touch panel 50, and the main section 42 is attached to the TFT substrate 33.

Specifically, as shown in FIG. 4, the rear surface of an end portion 42A of the main section 42 on the side close to the liquid crystal panel 31 (upper side in FIG. 2) in the Y axis direction is connected to the TFT substrate terminal section 33A through the ACF 42B (anisotropic conductive film). That is, the flexible substrate 40 is electrically connected to the liquid crystal panel 31 through the ACF 42B. The above-mentioned terminal section 41 is formed on the other end of the main section 42 in the longer side direction (side opposite to the side that is connected to the TFT substrate terminal section 33A).

On the other hand, on the front surface of the touch panel 50, a touch panel terminal section 50A is formed, and an end portion 43A of the extended section 43 on the side close to the touch panel (upper side in FIG. 2) is connected to the touch panel terminal section 50A through an ACF 43B (anisotropic conductive film). That is, the flexible substrate 40 is electrically connected to the touch panel 50 through the ACF 43B. As shown in FIG. 4, the extended section 43 is bent so as to reach both the touch panel terminal section 50A and the TFT substrate terminal section 33A. On the front and rear surfaces of the flexible substrate 40, wiring patterns (not shown) are formed. This way, the touch panel driver 22 is electrically connected to the touch panel 50 through the TFT substrate terminal section 33A and the flexible substrate 40. The shape of the extended section 43 is not limited to the substantial L shape, and it may be a rectangular shape, for example. That is, the extended section 43 may be formed in any shapes as long as it is extended from the periphery of the main section 42 to the touch panel terminal section 50A.

Next, assembly steps of the liquid crystal display device 10 will be explained. First, in the liquid crystal device 11 of this embodiment, the liquid crystal panel 31 and the touch panel 50 are bonded to each other, and thereafter, the liquid crystal panel driver 21 and the touch panel driver 22 are mounted on the TFT substrate terminal section 33A by the anisotropic conductive film. The step of bonding the liquid crystal panel 31 and the touch panel 50 and the step of mounting the liquid crystal panel driver 21 and the touch panel driver 22 on the TFT substrate terminal section 33A may be performed in reverse order. Thereafter, the main section 42 of the flexible substrate 40 is connected to the TFT substrate terminal section 33A through the ACF 42B, and the extended section 43 is connected to the touch panel terminal section 50A through the ACF 43B. With this step, the assembly of the liquid crystal device 11 is completed.

In attaching this liquid crystal device 11 to the backlight device 14, as shown in FIG. 1, the main section 42 of the flexible substrate 40 is bent in a U shape in a cross-sectional view, and the terminal section 41 on the other end is inserted to the connector 12a of the control circuit board 12 disposed on the rear surface of the chassis 14a. This way, the liquid crystal panel driver 21 and the touch panel driver 22 are electrically connected to the control circuit board 12, respectively, through the same flexible substrate 40. The liquid crystal device 11 and the backlight device 14 are subsequently contained in the housing members 15 and 16, and with this step, the assembly of the liquid crystal display device 10 is completed.

In this liquid crystal display device 10, if the surface thereof is pointed by a touch pen, a finger, or the like when the touch panel 50 is driven, a signal that is input from the touch panel 50 (coordinate data on the touch panel 50, for example) is sent to the control circuit board 12 through the touch panel driver 22 and the flexible substrate 40. Based on the received signal, the control circuit board 12 determines display information that is to be displayed on the liquid crystal panel 31, and sends driving signals that correspond to the display information to the flexible substrate 40 and the liquid crystal panel driver 21, thereby driving the liquid crystal panel 31.

As described above, in the liquid crystal device 11 of this embodiment, the liquid crystal panel driver 21 and the touch panel driver 22 are electrically connected to the control circuit substrate 12, respectively, through the same flexible substrate 40. This makes it easier to establish an electrical connection between the two drivers 21 and 22 and the control circuit board 12, as compared with a configuration where different flexible substrates are connected to the liquid crystal panel driver 21 and the touch panel driver 22 separately. In this embodiment, the liquid crystal panel driver 21 and the touch panel driver 22 may be integrated into a single component, and if the two drivers 21 and 22 are integrated, the number of parts can be reduced, leading to a reduction in the part mounting time.

The flexible substrate 40 is electrically connected to the touch panel 50 and to the liquid crystal panel 31, respectively, through the anisotropic conductive films. With this configuration, it becomes easier to electrically connect the flexible substrate 40 to the touch panel 50 and to the liquid crystal panel 31, respectively, as compared with a configuration where the electrical connection is established by soldering the respective members, for example.

The liquid crystal panel 31 is provided with the TFT substrate 33 that has the TFTs 17 for driving the liquid crystals in the respective pixels. The liquid crystal panel driver 21 is disposed on a surface of the TFT substrate 33 on the side facing the touch panel 50. The flexible substrate 40 has the main section 42 that is formed in a rectangular shape in a plan view and the extended section 43 that is extended from the periphery of the main section in a substantial L shape. The extended section 43 is attached to the touch panel 50, and the main section 42 is attached to the TFT substrate 33. The touch panel driver 22 is disposed on the surface of the TFT substrate 33 on the side facing the touch panel 50, and is electrically connected to the touch panel 50 through the flexible substrate 40.

Because the liquid crystal panel driver 21 and the touch panel driver 22 are arranged on the same surface (the surface of the TFT substrate 33 on the side facing the touch panel 50), it becomes easier to perform the mounting operation of the two drivers 21 and 22 at the same time. This improves the mounting workability as compared with a configuration where the two drivers 21 and 22 are respectively disposed on two surfaces opposite to each other, for example. Alternatively, the extended section 43 may be attached to the TFT substrate 33 (TFT substrate terminal section 33A), and the main section 42 may be attached to the touch panel 50 (touch panel terminal section 50A).

Embodiment 2

Next, Embodiment 2 of the present invention will be explained with reference to FIGS. 2, 6, and 7. The same reference characters are given to the same portions as those of the embodiment above, and the explanations thereof are not repeated. In a liquid crystal device 211 of this embodiment, the shape of a flexible substrate 240 differs from that of the embodiment above.

Figure 6:
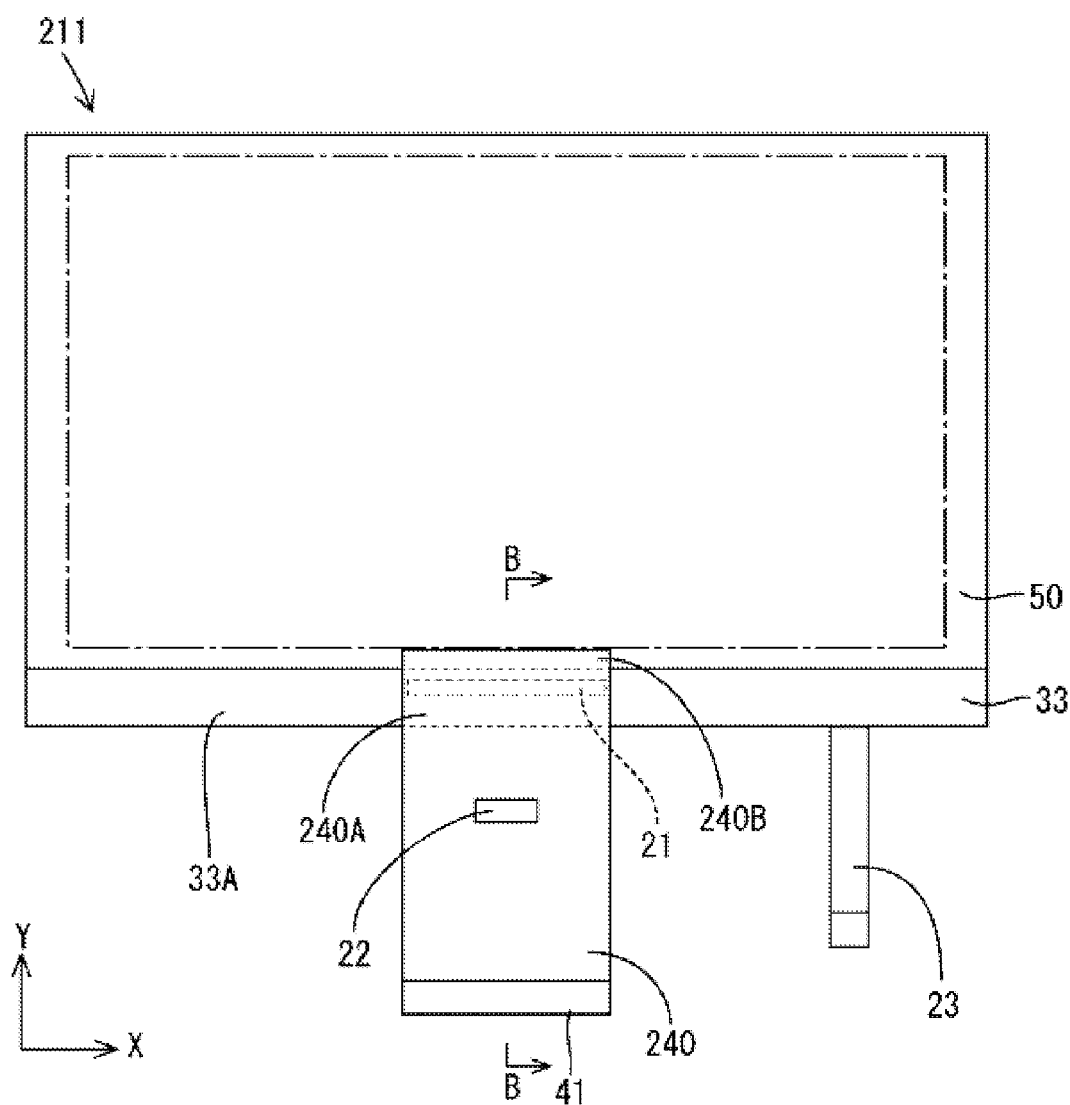
FIG. 6 is a plan view showing a liquid crystal device according to Embodiment 2 of the present invention.
Figure 7:
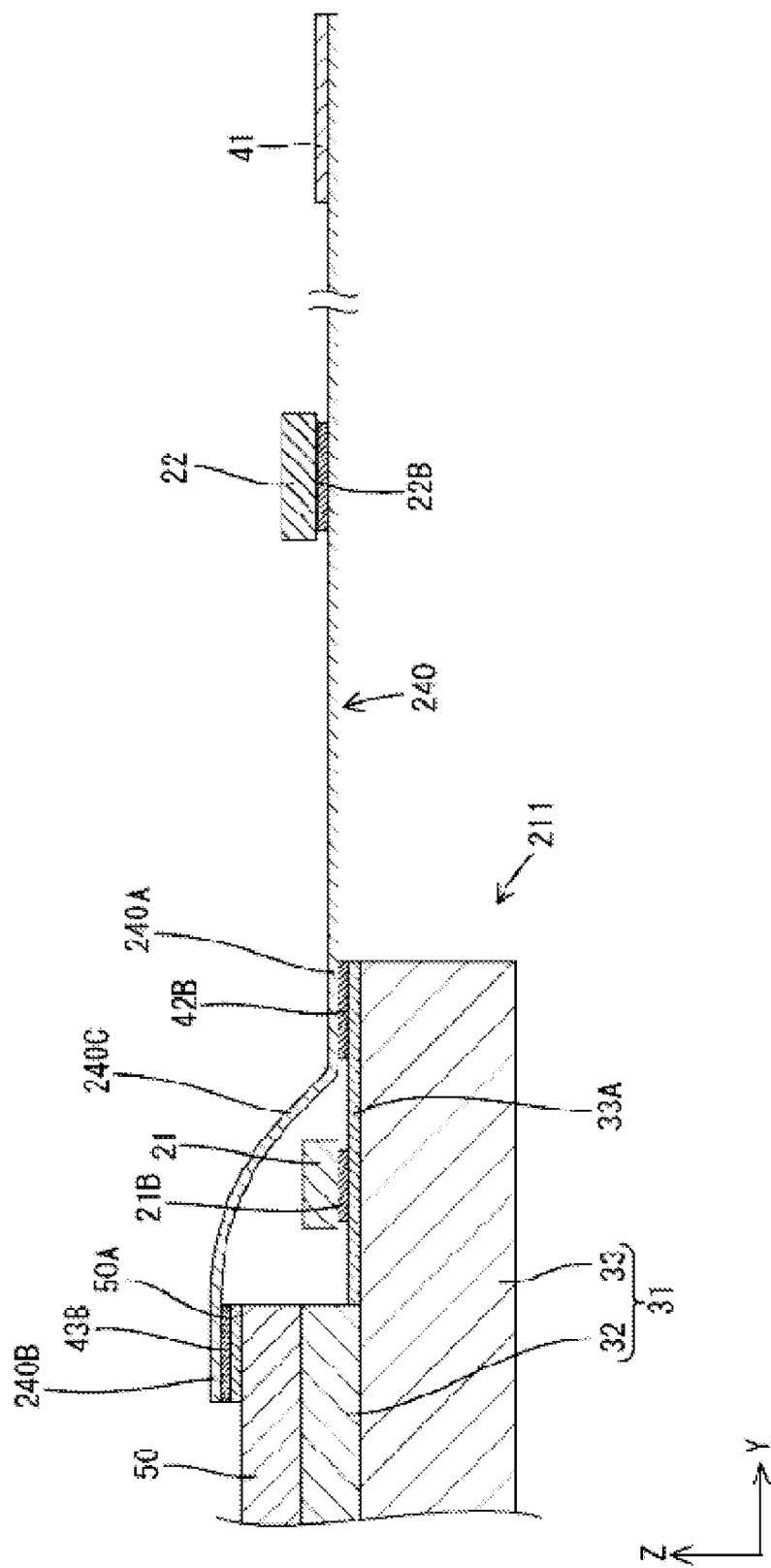
FIG. 7 is a cross-sectional view (cross-sectional view along the line B-B in FIG. 6) showing a cross-sectional configuration of a liquid crystal device along the shorter side direction.

As shown in FIG. 6, the flexible substrate 240 of this embodiment has a rectangular shape that is longer in the Y axis direction in a plan view. Also, as shown in FIG. 7, an end portion 240B of the flexible substrate 240 in the longer side direction (one side direction) is attached to the touch panel 50, and a center portion 240A of the flexible substrate 240 in the longer side direction (one side direction) is attached to the TFT substrate 33. Specifically, the rear surface of the end portion 240B is connected to the touch panel terminal section 50A through the ACF 43B. The rear surface of the center portion 240A is connected to the TFT substrate terminal section 33A through the ACF 42B.

That is, the flexible substrate 240 is affixed to the TFT substrate terminal section 33A in the center portion 240A, and is affixed to the touch panel terminal section 50A in the end portion 240B. A section of the flexible substrate 240 between the end portion 240B and the center portion 240A (middle portion 240C) in the longer side direction is bent. The liquid crystal panel driver 21 that is mounted on the TFT substrate terminal section 33A (surface of the element substrate on the side facing the touch panel) through an ACF 21B is covered by this middle portion 240C from the side of the display surface of the liquid crystal panel 31 (front side). As described above, by covering the liquid crystal panel driver 21 by a portion of the flexible substrate 240, the liquid crystal panel driver 21 can be protected.

The touch panel driver 22 is connected to the front surface of the flexible substrate 240 through an ACF 22B. The touch panel driver 22 may be mounted on the TFT substrate terminal section 33A, and the touch panel driver 22 may be covered by the middle portion 240C from the front side.

Embodiment 3

Next, Embodiment 3 of the present invention will be explained with reference to FIGS. 8 to 10. The same reference characters are given to the same portions as those in the respective embodiments above, and the explanations thereof are not repeated. In a liquid crystal device 311 of this embodiment, a touch panel 350 and a CF substrate 332 that constitutes a liquid crystal panel 331 are formed in the same size, and the touch panel 350 (or the CF substrate 332) is formed so as to be slightly larger than the TFT substrate 333.

Specifically, the length of the CF substrate 332 in the shorter side direction (Y axis direction) is longer than the length of the TFT substrate 333 in the shorter side direction (Y axis direction). The two substrates 332 and 333 are bonded to each other such that the CF substrate (and hence the touch panel 350) is extended beyond the TFT substrate 333 to one side (the lower side in FIG. 2 and the right side in FIG. 9). In this extended section (one end of the CF substrate 332 in the shorter side direction), a connecting terminal section 332A (connecting section) is formed.

Figure 9:
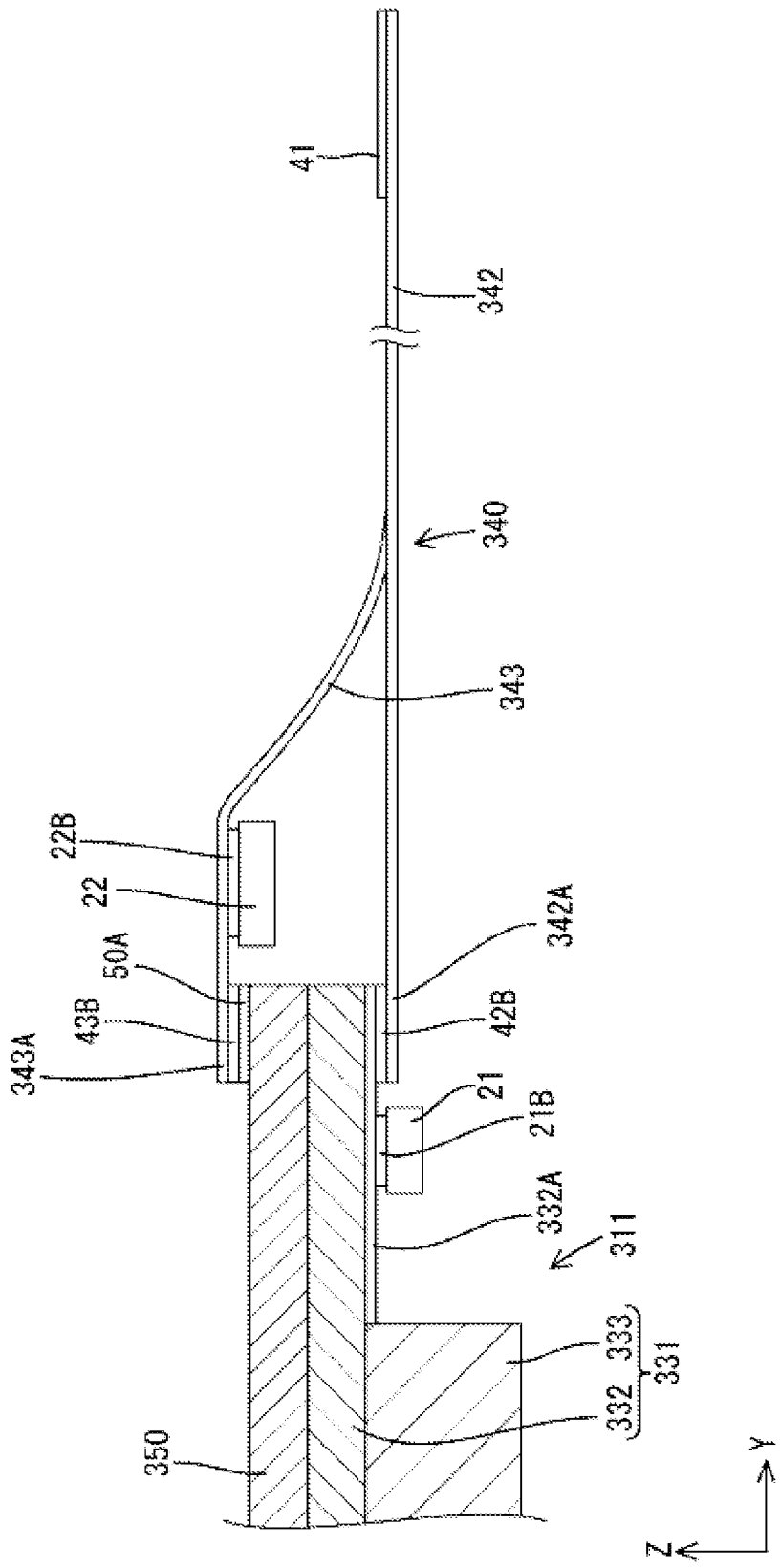
FIG. 9 is a cross-sectional view (cross-sectional view along the line C-C in FIG. 8) showing a cross-sectional configuration of a liquid crystal device along the shorter side direction.
Figure 10:
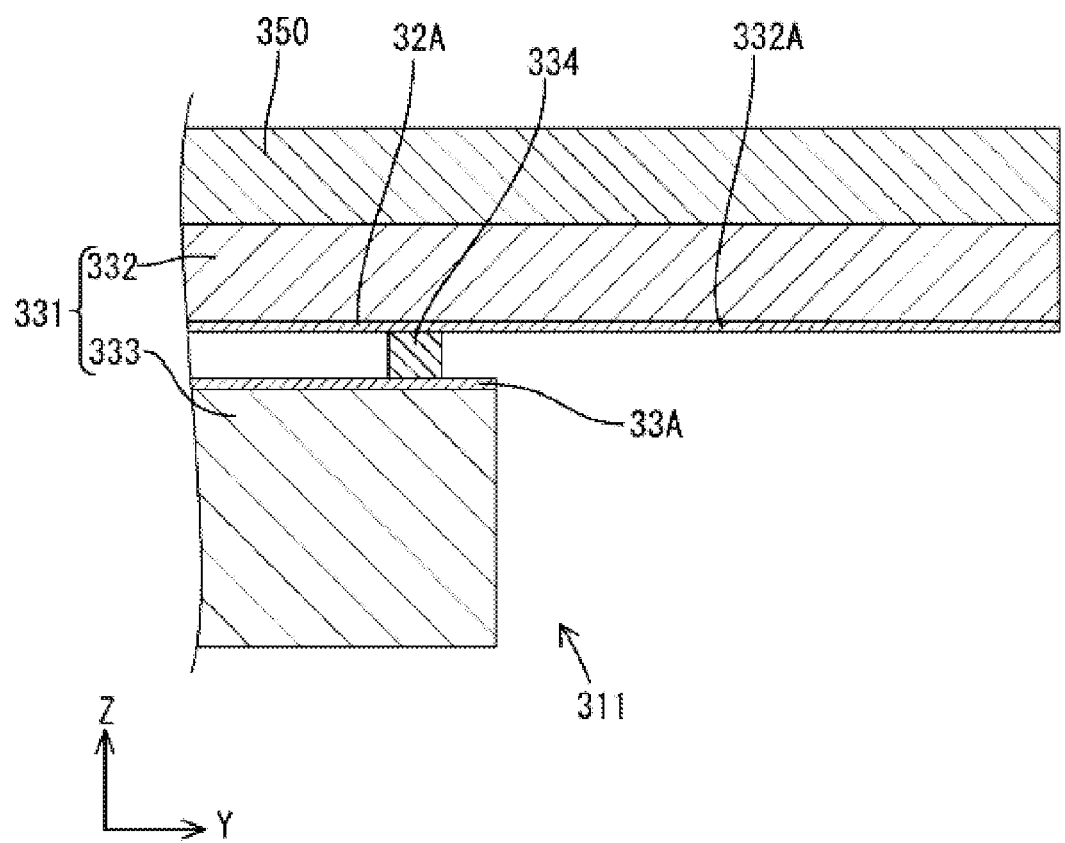
FIG. 10 is an enlarged cross-sectional view showing a section where a TFT substrate and a CF substrate face each other according to Embodiment 3 of the present invention.

As shown in FIG. 10, the connecting terminal section 332A is formed on a surface of the CF substrate 332 on the side facing the TFT substrate 333. The connecting terminal section 332A is connected to the TFT substrate terminal section 33A through a conductive member 334 (such as a conductive carbon paste), for example, and is thereby electrically connected to the TFT substrate 333. As shown in FIG. 9, the liquid crystal panel driver 21 is connected to the connecting terminal section 332A through the ACF 21B.

Figure 8:
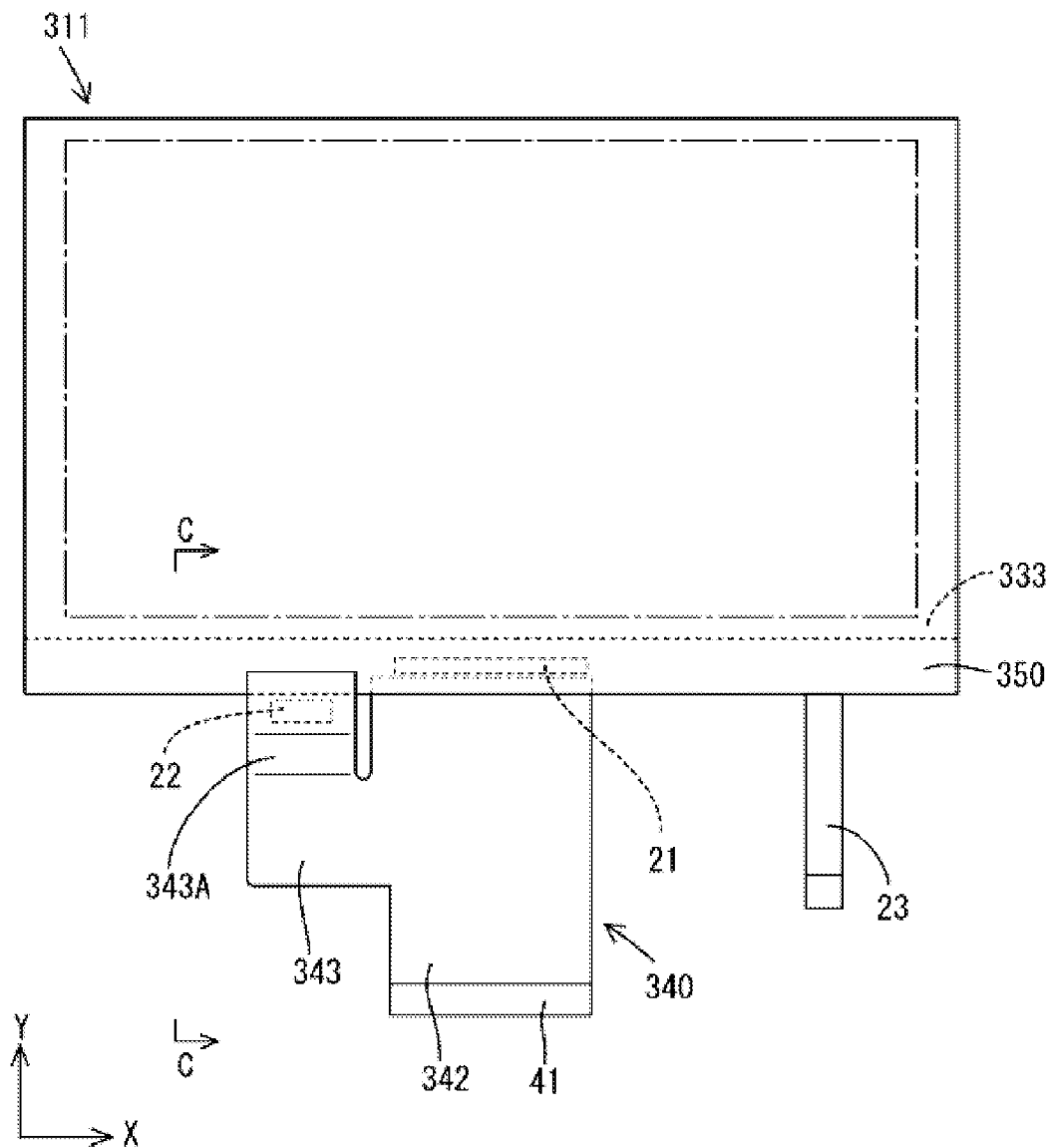
FIG. 8 is a plan view showing a liquid crystal device according to Embodiment 3 of the present invention.

As shown in FIG. 8, a flexible substrate 340 of this embodiment includes a main section 342 that is formed in a rectangular shape in a plan view and an extended section 343 that is extended from the periphery (longer side section) of the main section 342 and that is formed in a substantial L shape in a plan view. As shown in FIG. 9, an end 343A of the extended section 343 is bent toward the front side, and a rear surface of the end 343A is connected to the touch panel terminal section 50A of the touch panel 350 through the ACF 43B. The touch panel driver 22 is connected to the rear surface of the end 343A through the ACF 22B. A front surface of an end portion 342A of the main section 342 is connected to the connecting terminal section 332A through the ACF 42B. Alternatively, the extended section 343 may be attached to the connecting terminal section 332A, and the main section 342 may be attached to the touch panel 350 (touch panel terminal section 50A). The shape of the extended section 343 is not limited to the substantial L shape, and it may be a rectangular shape, for example. That is, the extended section 343 may be formed in any shapes as long as it is extended from the periphery of the main section 342 to the touch panel terminal section 50A.

In connecting the respective parts through the ACF (anisotropic conductive film), the ACF may be heated. In this embodiment, the connecting terminal section 332A is formed on the side of the CF substrate 332, and the liquid crystal panel driver 21 and the flexible substrate 340 are connected to the connecting terminal section 332A through the ACFs 21B and 42B. This way, it becomes possible to prevent heat generated in connecting parts (when the ACF is heated) from being transmitted to the TFT substrate 333.

The liquid crystal panel driver 21 is disposed on the rear surface of the CF substrate 332. That is, the CF substrate 332 covers the liquid crystal panel driver 21 from the display surface side of the liquid crystal panel 331, thereby protecting the liquid crystal panel driver 21. The touch panel driver 22 is mounted on the rear surface of the flexible substrate 340. That is, the flexible substrate 340 covers the touch panel driver 22 from the display surface side of the liquid crystal panel 331, thereby protecting the touch panel driver 22.

Embodiment 4

Next, Embodiment 4 of the present invention will be explained with reference to FIGS. 11 and 12. The same reference characters are given to the same portions as those of the respective embodiments above, and the explanations thereof are not repeated. In a liquid crystal device 411 of this embodiment, the shape of a flexible substrate 440 differs from that of Embodiment 3 above.

Figure 11:
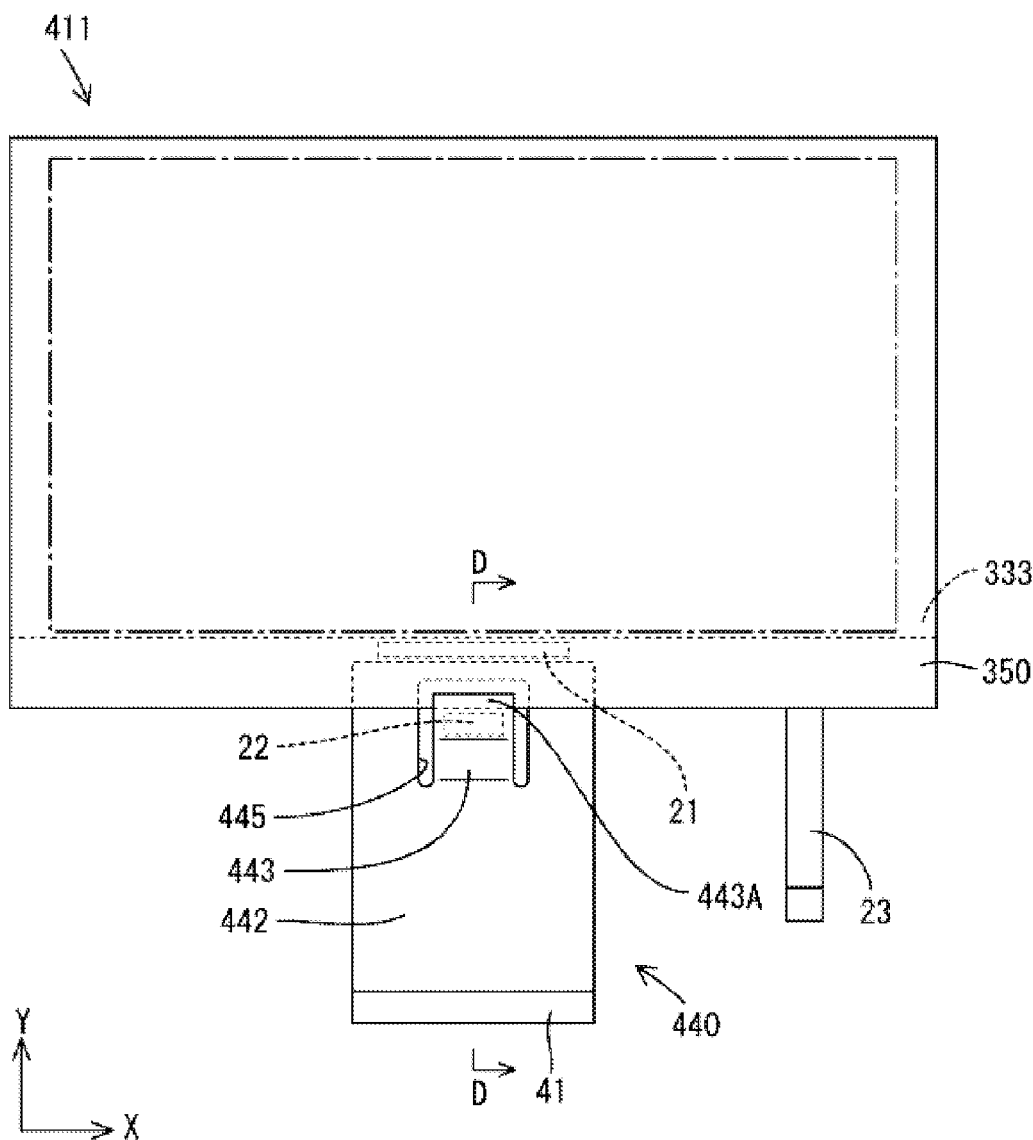
FIG. 11 is a plan view showing a liquid crystal device according to Embodiment 4 of the present invention.

As shown in FIG. 11, the flexible substrate 440 is formed in a rectangular shape that is longer in the Y axis direction in a plan view, and has a notch portion 445 that is made by cutting out an inner portion of the flexible substrate 440. The notch portion 445 is formed near the end portion of the flexible substrate 440 on the side close to the touch panel 350 so as to penetrate from the front surface to the rear surface, and has a substantial U shape in a plan view.

An area surrounded by this notch portion 445 becomes a flap 443. In other words, the flap 443 is made by cutting the flexible substrate 440. In the flexible substrate 440, the other area than the flap 443 is referred to as a main section 442. The flap 443 is formed in a rectangular shape in a plan view, and is separated from the main section 442 by the notch portion 445, except for the base end thereof (connecting portion to the main section 442). This way, the flap 443 can be bent separately (independently) from the main section 442, and therefore, it is possible to bend only the flap 443 toward the front side. The notch portion 445 is cut out in the substantial U shape such that an end 443A of the flap 443 is arranged on the side close to the touch panel 350 (upper side in FIG. 11), and the base end (connecting portion to the main section 442) of the flap 443 faces the side (lower side in FIG. 11) opposite to the side close to the touch panel 350 in the Y axis direction.

Figure 12:
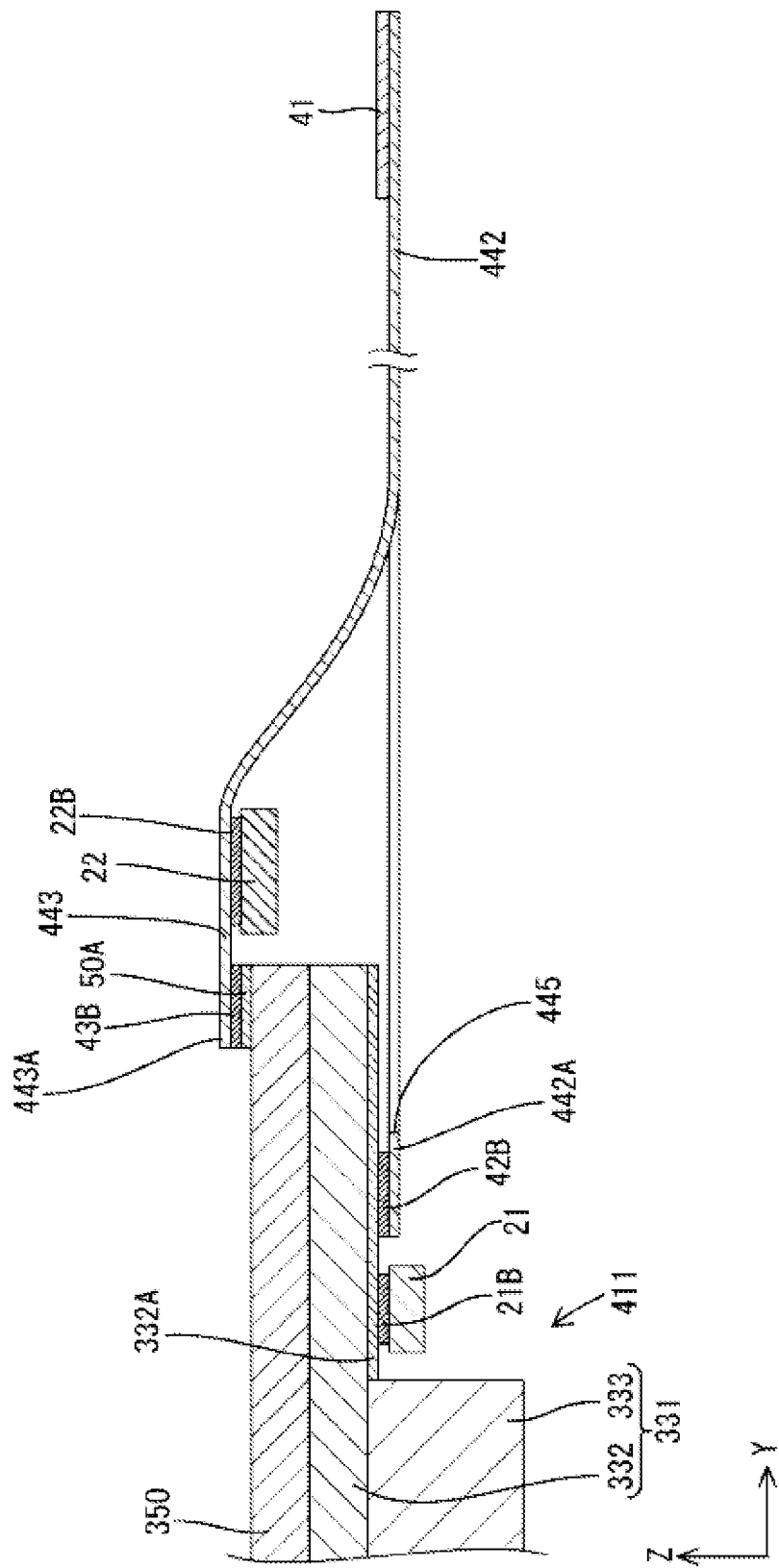
FIG. 12 is a cross-sectional view (cross-sectional view along the line D-D in FIG. 11) showing a cross-sectional configuration of a liquid crystal device along the shorter side direction.

As shown in FIG. 12, a rear surface of the end 443A of the flap 443 is connected to the touch panel terminal section 50A of the touch panel 350 through the ACF 43B. The touch panel driver 22 is connected to the rear surface of the flap 443 through the ACF 22B. A front surface of an end portion 442A of the main section 442 is connected to the connecting terminal section 332A through the ACF 42B. Alternatively, the flap 443 may be attached to the connecting terminal section 332A, and the main section 442 may be attached to the touch panel 350 (touch panel terminal section 50A).

As described above, in this embodiment, by cutting out a portion of the flexible substrate 440 that has a rectangular shape in a plan view, the flexible substrate 440 can be respectively connected to the touch panel terminal section 50A and to the connecting terminal section 332A that are formed on the surfaces opposite to each other. The flexible substrate 440 is formed in a rectangular shape in a plan view, allowing for easy handling in an assembly process and the like (such as transportation or storing them in an organized manner), for example.

Embodiment 5

Next, Embodiment 5 of the present invention will be explained with reference to FIGS. 13 and 14. The same reference characters are given to the same portions as those of the respective embodiments above, and the explanations thereof are not repeated. In a liquid crystal device 511 of this embodiment, the shape of a flexible substrate 540 differs from that of Embodiment 4 above.

Figure 13:
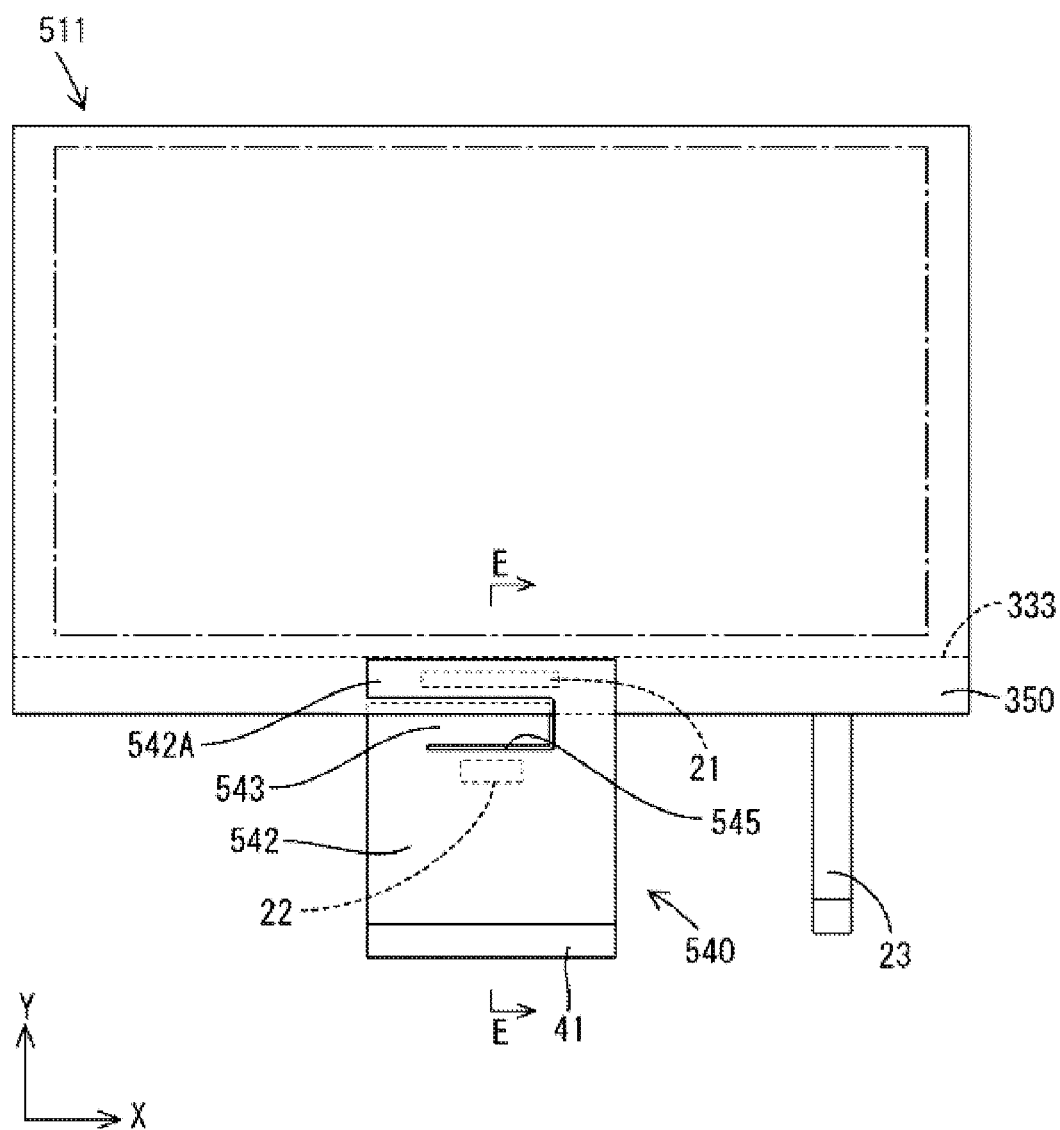
FIG. 13 is a plan view showing a liquid crystal device according to Embodiment 5 of the present invention.

As shown in FIG. 13, the flexible substrate 540 is formed in a rectangular shape that is longer in the Y axis direction in a plan view, and has a notch portion 545 that is made by cutting out a portion of the flexible substrate 540. The notch portion 545 is formed near the end portion of the flexible substrate 540 on the side close to the touch panel 350 so as to penetrate from the front surface to the rear surface, and has a substantial U shape in a plan view.

An area surrounded by this notch portion 545 becomes a flap 543. In other words, the flap 543 is made by cutting the edge portion of the flexible substrate 540. In the flexible substrate 540, the other area than the flap 543 is referred to as a main section 542, and an end portion of the main section 542 forms an end 542A that is in a substantial L shape in a plan view. This end 542A and the flap 543 are separated by the notch portion 545, and therefore, one of the flap 543 and the end 542A can be bent separately from the other.

Figure 14:
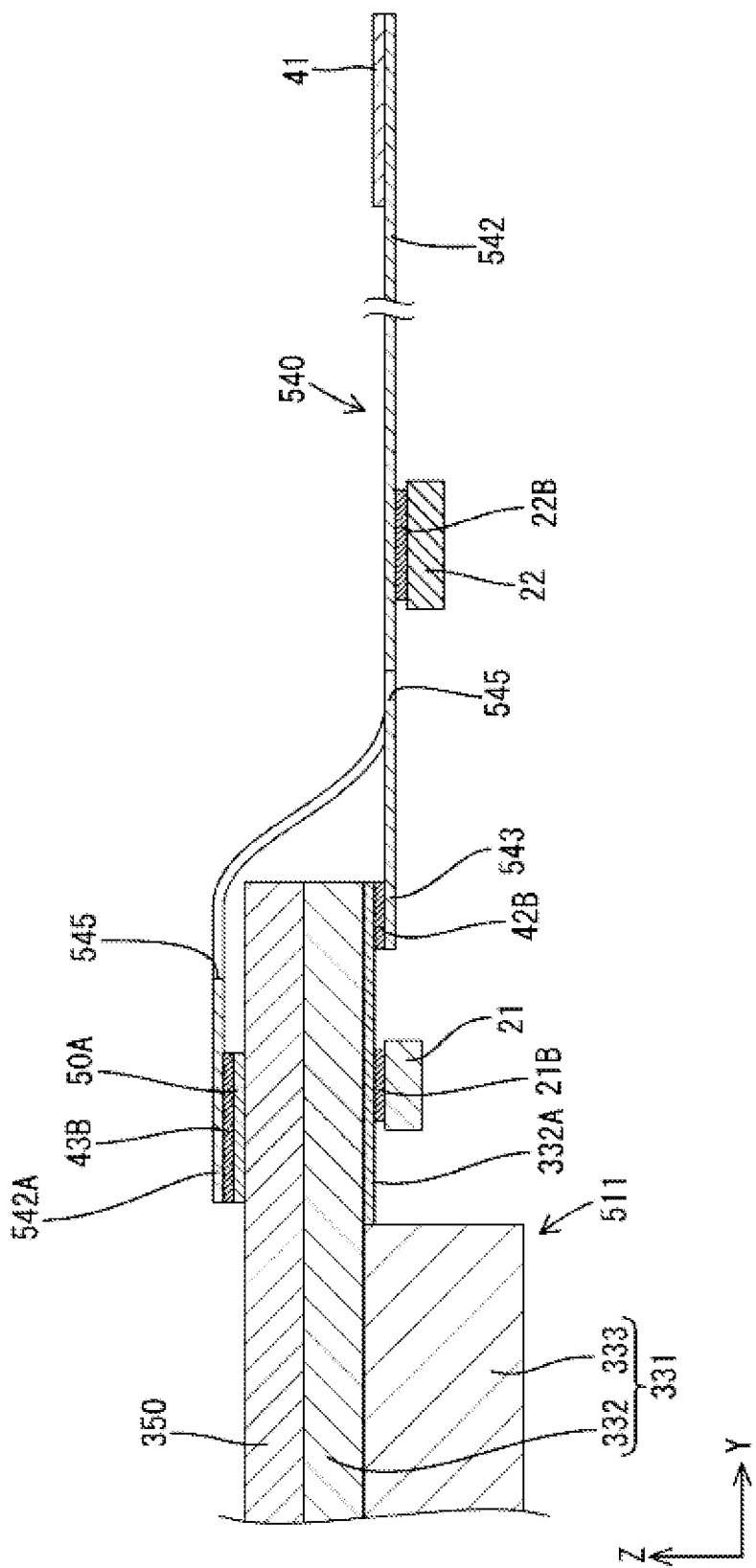
FIG. 14 is a cross-sectional view (cross-sectional view along the line E-E in FIG. 13) showing a cross-sectional configuration of a liquid crystal device along the shorter side direction.

As shown in FIG. 14, in this embodiment, the end 542A of the main section 542 is bent toward the front side. A rear surface of the end 542A is connected to the touch panel terminal section 50A of the touch panel 350 through the ACF 43B. A front surface of an end portion of the flap 543 is connected to the connecting terminal section 332A through the ACF 42B. The touch panel driver 22 is connected to a rear surface of the main section 542 through the ACF 22B. Alternatively, the flap 543 may be attached to the touch panel 350 (touch panel terminal section 50A), and the main section 542 may be attached to the connecting terminal section 332A.

Embodiment 6

Next, Embodiment 6 of the present invention will be explained with reference to FIG. 15. The same reference characters are given to the same portions as those of the respective embodiments above, and the explanations thereof are not repeated. In a liquid crystal device 611 of this embodiment, the shape of a flexible substrate 640 differs from that of the respective embodiments above.

Figure 15:
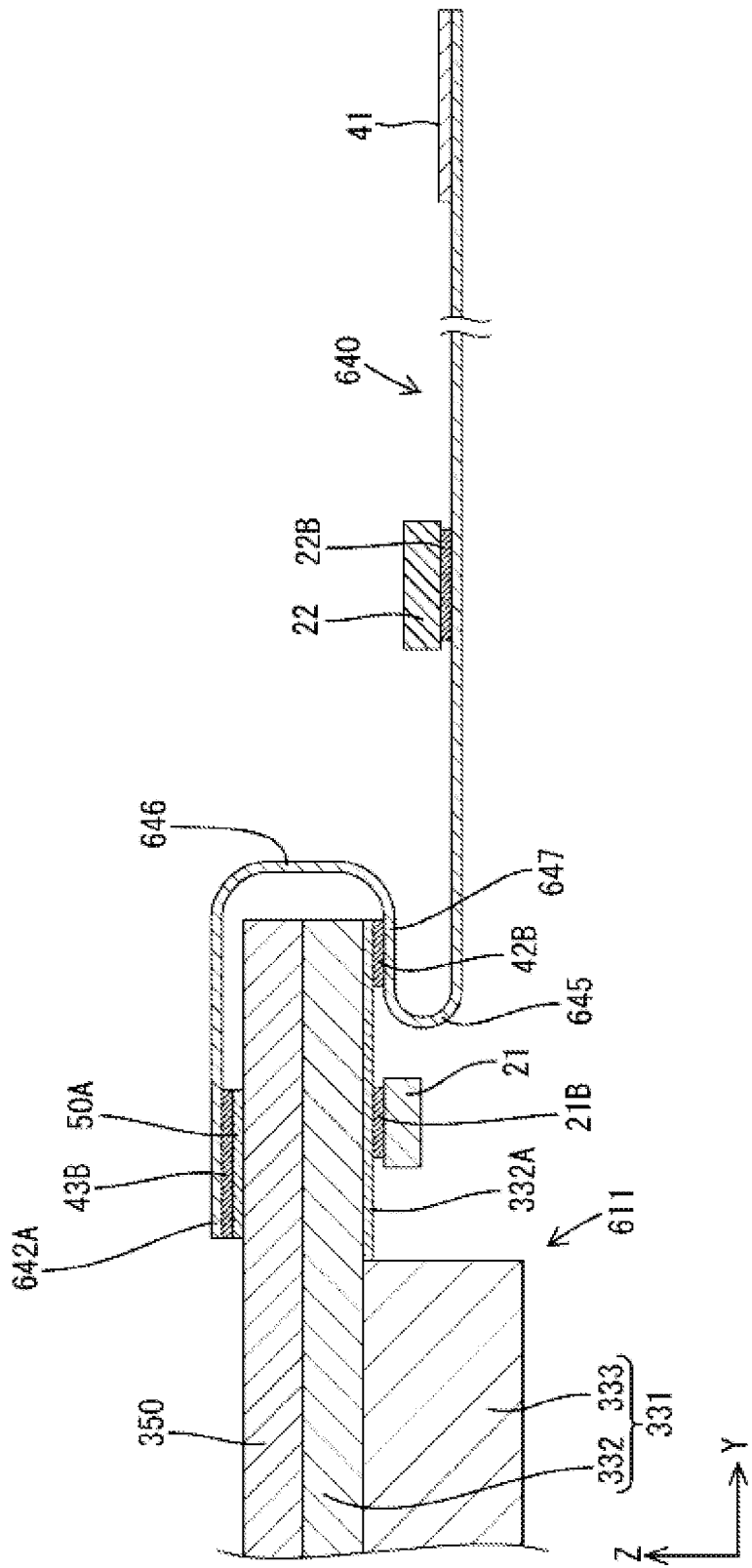
FIG. 15 is a cross-sectional view showing a cross-sectional configuration along the shorter side direction of a liquid crystal device according to Embodiment 6 of the present invention.

As shown in FIG. 15, the flexible substrate 640 is a rectangular substrate that is longer in the Y axis direction, and a portion thereof near the end on the side close to the liquid crystal panel 331 is folded at two locations, thereby forming a substantial S shape in a cross-sectional view. Specifically, in the flexible substrate 640, by folding a portion thereof near the end on the side close to the liquid crystal panel 331 toward the side opposite to the liquid crystal panel 331, a folded section 645 is formed, and by further folding an end portion that is closer to the liquid crystal panel 331 than this folded section 645 toward the liquid crystal panel, a folded section 646 is formed.

With this configuration, it becomes possible to dispose the flexible substrate 640 so as to sandwich a stack of the touch panel 350 and the CF substrate 332 from the front and rear sides by an end 642A (edge portion of the flexible substrate) and a middle portion 647 that is located between the two folded sections 645 and 646. A rear surface of the end 642A is connected to the touch panel terminal section 50A of the touch panel 350 through the ACF 43B. A front surface of the middle portion 647 is connected to the connecting terminal section 332A through the ACF 42B. The touch panel driver 22 is connected to the front surface of the flexible substrate 640 through the ACF 22B.

In the configuration of this embodiment, by folding the single flexible substrate 640 at two locations, the flexible substrate 640 can be respectively connected to the touch panel terminal section 50A and the connecting terminal section 332A that are formed on the surfaces opposite to each other. This configuration can eliminate the need to form the notch section as described in Embodiments 4 and 5 above or the like in the flexible substrate 640, for example, and is therefore preferable.

Embodiment 7

Next, Embodiment 7 of the present invention will be explained with reference to FIG. 16. The same reference characters are given to the same portions as those of the respective embodiments above, and the explanations thereof are not repeated. A flexible substrate 740 in a liquid crystal device 711 of this embodiment is a rectangular substrate that is longer in the Y axis direction, and a portion thereof near the end on the side close to the liquid crystal panel 331 is folded at two locations, thereby forming a substantial S shape in a cross-sectional view with two folded sections 745 and 746. The specific manner of folding the substrate is similar to that of Embodiment 6 above, and therefore, the explanation thereof is omitted.

Figure 16:
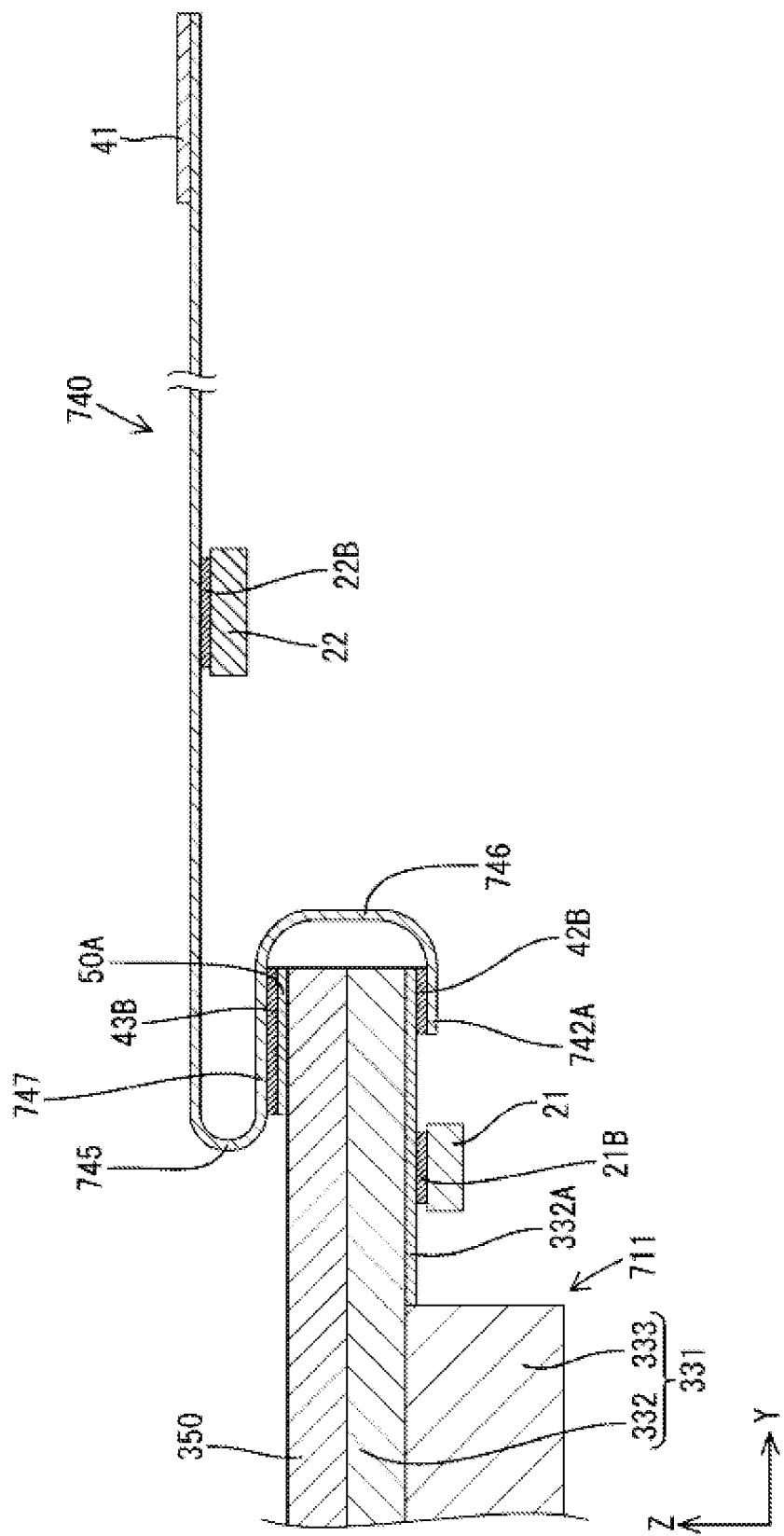
FIG. 16 is a cross-sectional view showing a cross-sectional configuration along the shorter side direction of a liquid crystal device according to Embodiment 7 of the present invention.

As shown in FIG. 16, in the flexible substrate 740, a front surface of an end 742A (edge portion of the flexible substrate) is connected to the connecting terminal section 332A through the ACF 42B. A rear surface of a middle portion 747 (a section between two folded sections 745 and 746) is connected to the touch panel terminal section 50A of the touch panel 350 through the ACF 43B. The touch panel driver 22 is connected to the rear surface of the flexible substrate 740 through the ACF 22B.

Embodiment 8

Next, Embodiment 8 of the present invention will be explained with reference to FIG. 17. The same reference characters are given to the same portions as those of the respective embodiment above, and the explanations thereof are not repeated. In a liquid crystal device 811 of this embodiment includes a parallax barrier 850 as an additional function component.

Figure 17:
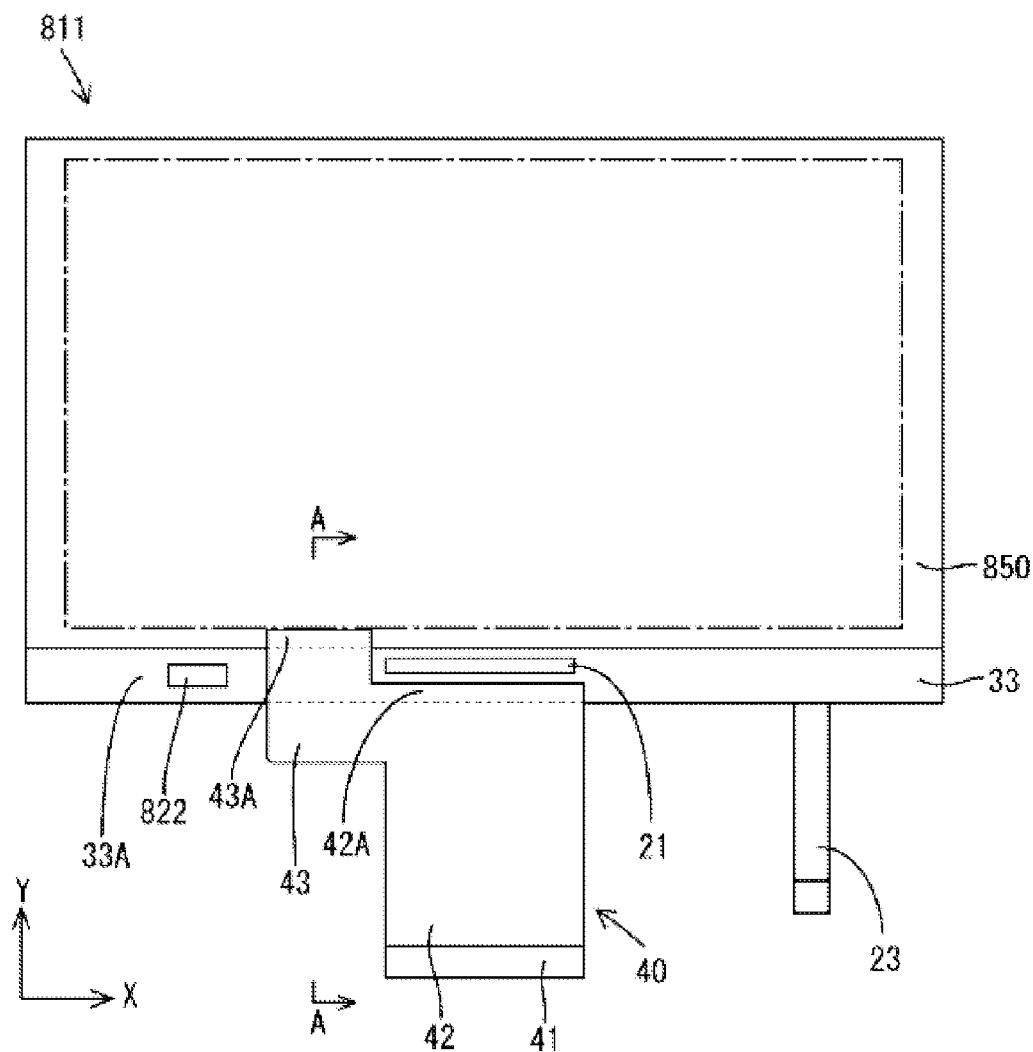
FIG. 17 is a plan view showing a liquid crystal device according to Embodiment 8 of the present invention.

The parallax barrier 850 is disposed so as to cover the display surface of the liquid crystal panel 31 (FIG. 17 only shows the TFT substrate 33 that constitutes the liquid crystal panel). The parallax barrier 850 includes a pair of substrates (not shown) made of transparent glass (having a light-transmitting property) and a liquid crystal layer (not shown) that is interposed between the two substrates and that includes liquid crystal molecules, which change its optical property in accordance with electrical field application.

The parallax barrier 850 is capable of controlling the orientation state and the light transmittance of the liquid crystal molecules section by section in accordance with a voltage applied to the liquid crystal layer. This allows a certain set of pixels in the liquid crystal panel 31 to be seen by the right eye of a viewer and another set of pixels to be seen by the left eye, making possible a three-dimensional display.

That is, the parallax barrier 850 is a switching liquid crystal panel that can display a planar image (2D image, two-dimensional image) and a stereoscopic image (3D image, three-dimensional image) interchangeably on the display surface of the liquid crystal panel 31 by actively controlling the light transmittance of the liquid crystal layer.

A parallax barrier driver 822 (additional function component driver) for driving the parallax barrier 850 is disposed in the TFT substrate terminal section 33A. This way, the parallax barrier driver 822 is electrically connected to the parallax barrier 850 through the TFT substrate terminal section 33A and the flexible substrate 40.

Embodiment 9

Figure 18:
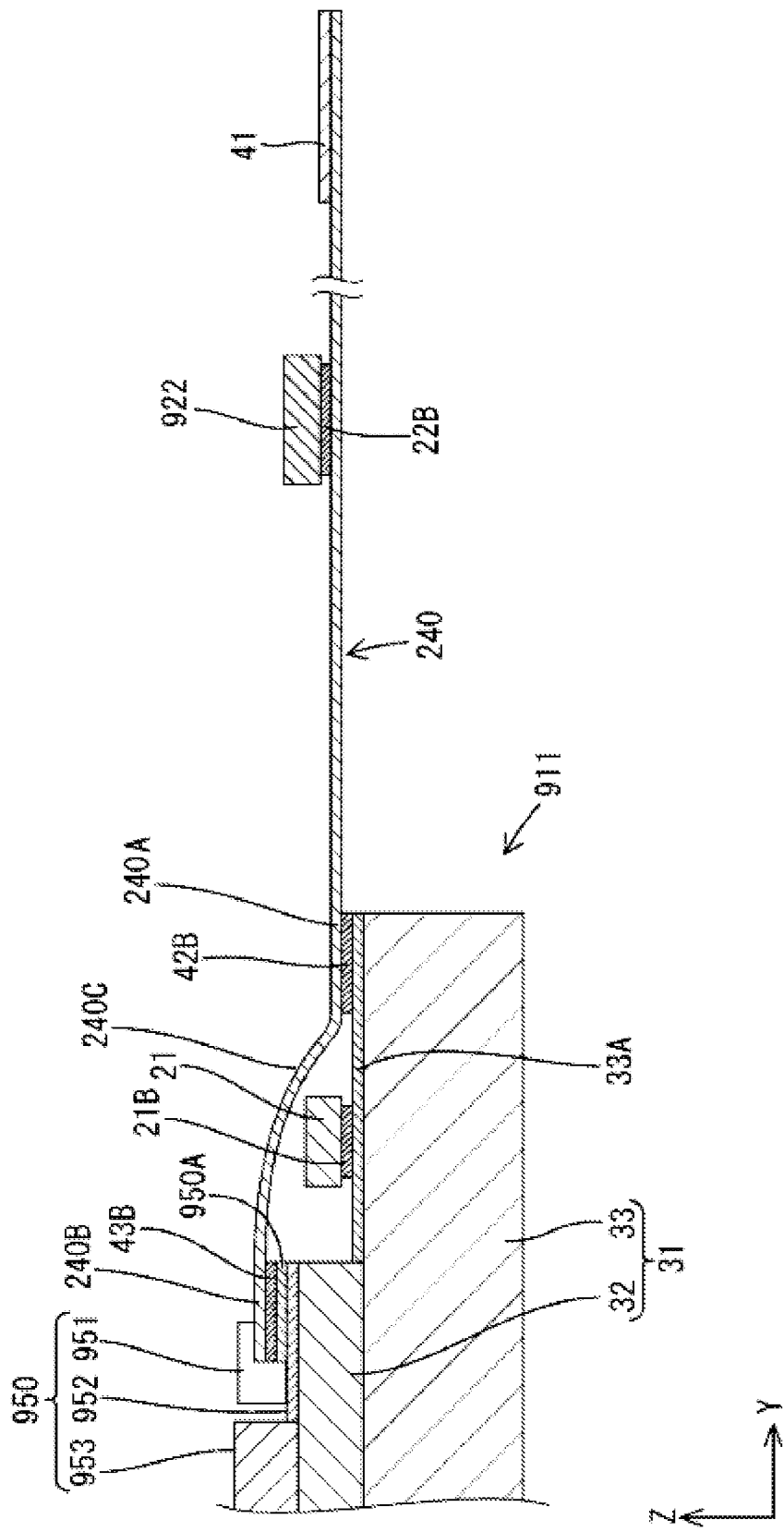
FIG. 18 is a cross-sectional view showing a cross-sectional configuration along the shorter side direction of a liquid crystal device according to Embodiment 9 of the present invention.

Next, Embodiment 9 of the present invention will be explained with reference to FIG. 18. The same reference characters are given to the same portions as those of the respective embodiment above, and the explanations thereof are not repeated. In a liquid crystal device 911 of this embodiment, a front light 950 is provided as an additional function component.

The front light 950 is disposed so as to cover the display surface of the liquid crystal panel 31. This front light 950 is used as a light source when the liquid crystal device 911 is employed for a reflective liquid crystal display device, for example. The liquid crystal device 911 may be provided with both the front light 950 and a backlight.

The front light 950 includes LEDs 951 as a light source, an LED substrate 952 having a plurality of LED 951 mounted thereon, and a light guide plate 953. The LED substrate 952 may have a single LED 951 mounted thereon.

The light guide plate 953 is formed as a flat plate so as to cover the display surface of the liquid crystal panel 31, and is made of a synthetic resin having a high transparency such as acryl or the like. The respective LEDs 951 are disposed such that the light-emitting surfaces thereof face the side surface of the light guide plate 953 (to the left side in FIG. 18). This way, light emitted from the LEDs 951 enters the light guide plate 953 through the side surface, and after traveling through the light guide plate 953, emerges toward the liquid crystal panel 31 through the surface facing the liquid crystal panel 31.

A terminal section 950A provided in the LED substrate 952 is connected to the flexible substrate 240 through the ACF 43B. An LED driver 922 (additional function component driver) for driving the LEDs 951 is connected to the front surface of the flexible substrate 240 through the ACF 22B. That is, the LED driver 922 is electrically connected to the LEDs 951 through the flexible substrate 240.

The light source provided in the front light 950 is not limited to the LEDs 951, and instead of the LEDs 951, cold-cathode fluorescent lamps or the like may be employed, for example.

Other Embodiments

The present invention is not limited to the embodiments explained with the descriptions and figures above, and the following embodiments are included in the scope of the present invention, for example.

(1) In the respective embodiments above, the anisotropic conductive films were used for connecting the flexible substrate to the respective terminal sections (TFT substrate terminal section 33A, touch panel terminal section 50A, and connecting terminal section 332A) and for mounting the touch panel driver and the liquid crystal panel driver, but the present invention is not limited to such. The shape of the respective flexible substrates is not limited to the shapes described in the respective embodiments above, and the flexible substrate may be formed in any shapes as long as it can connect the liquid crystal panel driver 21 and the touch panel driver 22 to the control circuit board 12 (external driving circuit).

(2) In the respective embodiments above, the touch panels 50 and 350 were formed in the same size as the CF substrates 32 and 332, but the present invention is not limited to such. The touch panels 50 and 350 may be smaller than the CF substrates 32 and 332, for example. That is, it may be configured that the touch panels 50 and 350 cover a portion of the display surface of the liquid crystal panels 31 and 331.

(3) In the respective embodiments above, the connecting terminal section 332A that is electrically connected to the TFT substrate terminal section 33A was described as an example of the connecting section, but the configuration of the connecting section is not limited to such, and any other configurations may be employed as long as the connecting section is disposed on the CF substrate, and is electrically connected to the TFT substrate 33.

(4) In the respective embodiments above, the TFT substrates 33 and 333 using the TFTs 17 were described as examples of the element substrate, but other element substrates using other switching elements than the TFTs (thin film diodes (TFDs), for example) may also be used.

(5) In the respective embodiments above, the touch panel, the parallax barrier, the front light, and the like were described as examples of the additional function component, but the additional function component is not limited to these components. The additional function component may be any components that provide a certain additional function to the display of the liquid crystal panel. The backlight device 14 that covers a surface (front surface of the liquid crystal panel) of the liquid crystal panel on the side opposite to the display surface may be the additional function component, and a driver for driving the light source in the backlight device 14 may be the additional function component driver, for example.

(6) In Embodiments 8 and 9 described above, the flexible substrate may be configured in a manner similar to those in other embodiments (Embodiments 1 to 7). Also, the installation location of the additional function component driver in Embodiments 8 and 9 may be the same as the installation locations of the respective additional function component drivers described in Embodiments 1 to 7.

(7) Embodiment 8 above may be configured to include a touch panel. When the liquid crystal device is provided with both of a parallax barrier and a touch panel, it can be configured such that a touch panel, a parallax barrier, and a liquid crystal panel are laminated in this order from the side of the display surface, for example.

DESCRIPTION OF REFERENCE CHARACTERS 11, 211, 311, 411, 511, 611, 711 liquid crystal device
12 control circuit board (external driving circuit)
17 TFT (thin-film transistor, switching element)
21 liquid crystal panel driver
21B, 22B, 42B, 43B ACF (anisotropic conductive film)
22 touch panel driver (additional function component driver)
31, 331 liquid crystal panel
32, 332 CF substrate (color filter substrate)
33, 333 TFT substrate (element substrate)
40, 240, 340, 440, 540, 640, 740 flexible substrate
42, 342 main section
43, 343 extended section
50, 350 touch panel (additional function component)
240B end portion (end portion of flexible substrate in one side direction)
240A center portion (center portion of flexible substrate in one side direction)
240C middle portion (portion between end portion and center portion of flexible substrate in one side direction)
332A connecting terminal section (connecting section)
442, 542 main section (other main section)
443, 543 flap
642A, 742A end (edge portion of flexible substrate)
645, 646, 745, 746 folded section
647, 747 middle portion (between two folded sections)
822 parallax barrier driver (additional function component driver)
850 parallax barrier (additional function component)
922 LED driver (additional function component driver)
950 front light (additional function component)

The invention claimed is:
1. A liquid crystal device comprising:
a liquid crystal panel;
a liquid crystal panel driver that drives the liquid crystal panel;
an additional function component disposed so as to cover a surface of the liquid crystal panel, the additional function component providing an additional function to a display of the liquid crystal panel;
an additional function component driver that drives the additional function component; and
a flexible substrate that is electrically connected to an external driver circuit that respectively controls a drive of the liquid crystal panel and a drive of the additional function component,
wherein the liquid crystal panel driver and the additional function component driver are electrically connected to the external driver circuit, respectively, through the same flexible substrate,
wherein the additional function component is arranged on a display surface side of the liquid crystal panel,
wherein the liquid crystal panel is provided with an element substrate that has switching elements for driving liquid crystals in respective pixels and a color filter substrate that is disposed between the element substrate and the additional function component, the color filter substrate being larger than the element substrate in at least one dimension having an extended portion that protrudes beyond an edge of the element substrate,
wherein, on a surface of the color filter substrate on a side facing the element substrate, including said extended portion thereof, a connecting section that is electrically connected to the element substrate is formed,
wherein the liquid crystal panel driver is connected to the connecting section through an anisotropic conductive film,
wherein the flexible substrate has a main section that is formed in a rectangular shape in a plan view and an extended section that is extended from a periphery of the main section,
wherein the additional function component is larger than the element substrate of the liquid crystal panel in at least one dimension, having an extended portion that protrudes beyond the edge of the element substrate in a plan view, wherein, of the main section and the extended section of the flexible substrate, one is attached to the additional function component, and the other is attached to the connecting section, and wherein said one of the main section and the extended section of the flexible substrate is attached to a top surface of said extended portion of the additional function component.

2. The liquid crystal device according to claim 1, wherein the additional function component is a touch panel that is disposed on a display surface side of the liquid crystal panel, and wherein the additional function component driver is a touch panel driver that drives the touch panel.

* * * * *